(12) United States Patent
Inoue

(10) Patent No.: US 6,204,930 B1
(45) Date of Patent: Mar. 20, 2001

(54) METHOD OF GENERATING GRADATION-CORRECTED IMAGE DATA, METHOD OF GENERATING GRADATION-CORRECTED HALFTONE DOT PERCENTAGE DATA, METHOD OF GENERATING GRADATION-CORRECTED THRESHOLD DATA, IMAGE OUTPUT APPARATUS, AND METHOD OF CALCULATING AMOUNT OF EXPOSURE

(75) Inventor: Yoshiaki Inoue, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 08/872,732

(22) Filed: Jun. 11, 1997

(30) Foreign Application Priority Data

Jun. 12, 1996 (JP) .................................................. 8-150587

(51) Int. Cl.$^7$ ............................ H04N 1/405; H04N 1/407
(52) U.S. Cl. ........................... 358/1.9; 358/456; 358/459
(58) Field of Search .............................. 358/1.9, 1.7, 456, 358/458, 459, 298, 534, 521

(56) References Cited

FOREIGN PATENT DOCUMENTS

| 6-303429 | 10/1994 | (JP) | ................................. H04N 1/40 |
| 7-336536 | 12/1995 | (JP) | ................................. H04N 1/403 |
| 8-98025 | 4/1996 | (JP) | ................................. H04N 1/405 |

*Primary Examiner*—Scott Rogers
(74) *Attorney, Agent, or Firm*—Sughrue, Mion, Zinn, Macpeak & Seas, PLLC

(57) ABSTRACT

A gradation-corrected image data is generated by converting an input gradation image data depending on conditions of an output machine and thereafter scanning a recording medium in the output machine with a light beam based on the gradation-corrected image data. Specifically, an amount-of-exposure distribution is calculated based on a shape of recording dots corresponding to input gradations and specification details of the light beam step. Then, a density distribution of an image on the recording medium is calculated from the calculated amount-of-exposure distribution and characteristics of density characteristics regarding an amount of exposure of the recording medium step. Output gradations recorded on the recording medium are calculated based on the calculated density distribution, generating an input/output gradation characteristic curve, from which a gradation corrective curve is generated as an inverse function. The gradation image data is then converted into the gradation-corrected image data according to the gradation corrective curve.

18 Claims, 17 Drawing Sheets

FIG.17A
FILM HALFTONE
DOT AREA PERCENTAGE (%)

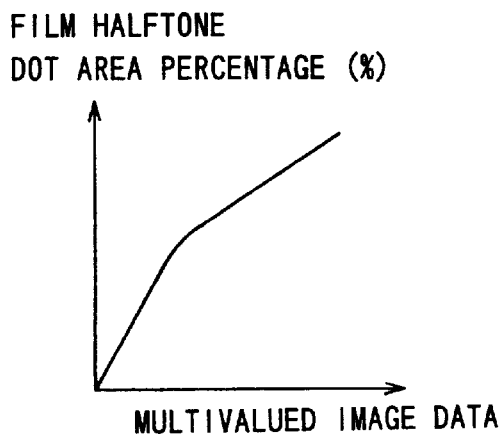

MULTIVALUED IMAGE DATA

FIG.17B
POSITIVE FILM HALFTONE
DOT AREA PERCENTAGE (%)

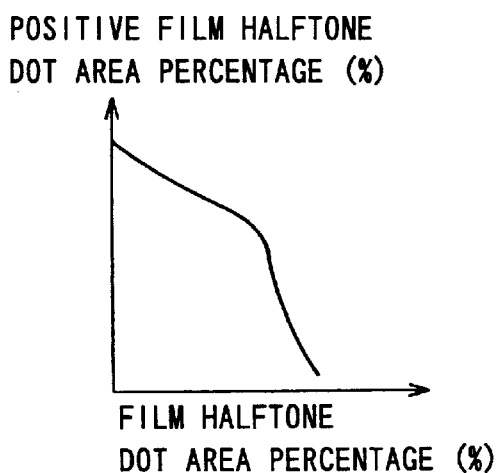

FILM HALFTONE
DOT AREA PERCENTAGE (%)

FIG.17C
PRINTING PLATE HALFTONE
DOT AREA PERCENTAGE (%)

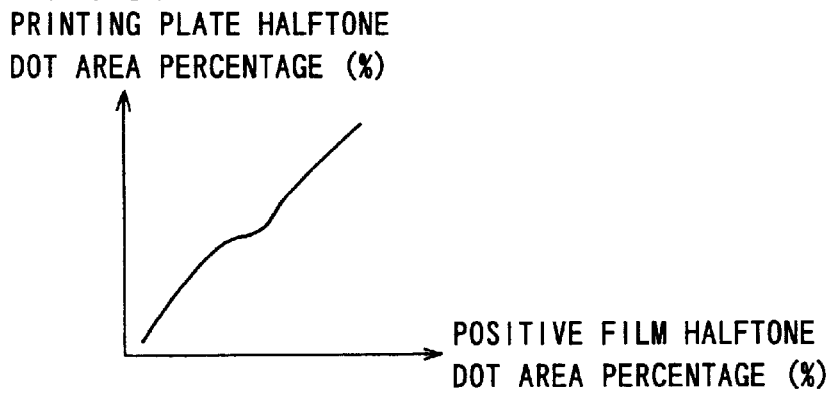

POSITIVE FILM HALFTONE
DOT AREA PERCENTAGE (%)

FIG.17D
PRINTED DOCUMENT HALFTONE
DOT AREA PERCENTAGE (%)

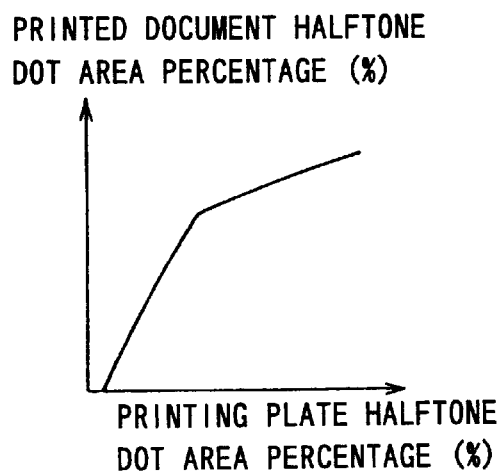

PRINTING PLATE HALFTONE
DOT AREA PERCENTAGE (%)

FIG.17E
PRINTED DOCUMENT HALFTONE
DOT AREA PERCENTAGE (%)

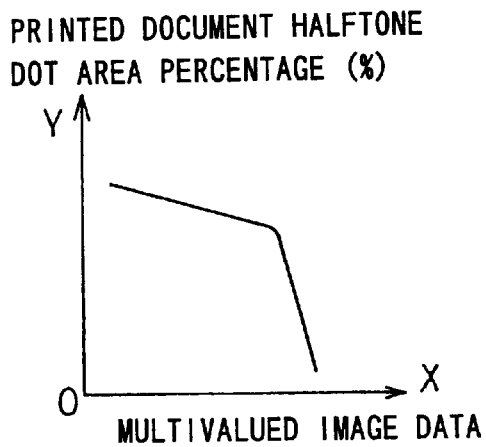

MULTIVALUED IMAGE DATA

METHOD OF GENERATING GRADATION-CORRECTED IMAGE DATA, METHOD OF GENERATING GRADATION-CORRECTED HALFTONE DOT PERCENTAGE DATA, METHOD OF GENERATING GRADATION-CORRECTED THRESHOLD DATA, IMAGE OUTPUT APPARATUS, AND METHOD OF CALCULATING AMOUNT OF EXPOSURE

BACKGROUND OF THE INVENTION

1. Field of the Invention

The present invention relates to a method of generating gradation-corrected image data, a method of generating gradation-corrected halftone dot percentage data, a method of generating gradation-corrected threshold data, an image output apparatus, and a method of calculating amount of exposure, for preventing a gradation jump or tone jump on an outputted image, suitable for use in an image output system such as a printing scanner for outputting a film with a halftone-dot image formed thereon, a CTP (Computer To Plate) output system for outputting a printing plate with a halftone-dot image formed thereon, or a color printer for outputting a hard copy which carries an image according to density gradation principles.

2. Description of the Related Art

One example of the cause of a gradation jump or tone jump will be described below.

An image reading/outputting apparatus, for example, as a halftone dot generator photoelectrically reads the image information of a subject with an image sensor to produce gradation image data (also referred to as multivalued image data or continuous image data) and thereafter compares the gradation image data with threshold data to generate binary image data (also referred to as halftone-dot image data).

The image reading/outputting apparatus applies a laser beam, which is turned on and off, i.e., modulated, by the binary image data, to scan a film coated with a photosensitive material for thereby producing a film on which a halftone-dot image is formed.

The halftone-dot image formed on the film is an area-gradation image whose gradation is expressed by forming black pixels such that halftone-dot area percentages will be obtained depending on the gradation of the gradation image data.

FIG. 16 of the accompanying drawings schematically shows a halftone-dot image 1 whose halftone-dot area percentage is 50%. As shown in FIG. 16, the halftone-dot image 1 has black pixels 3 in regions 2a, 2b which contact each other at a point 4. The black regions 2a, 2b also contact black regions of other halftone-dot images (not shown) each having a halftone-dot area percentage of 50%.

At the points 4 where the black regions contact each other, the laser beams for forming the pixels 3 overlap each other. Therefore, each of the points 4 tends to spread, and fails to achieve an accurate halftone-dot area percentage of 50%. Instead, each of the points 4 suffers a tone jump as a gradation distortion when the images are reproduced.

Such a halftone-dot image is formed on a film as a negative film by a film producing process, which is then converted to a positive film by a film converting process. From the positive film, there is produced a pressing plate by a printing plate producing process, which will be used in a printing process to produce a printed document.

If no accurate halftone-dot area percentage is accomplished due to a tone jump, then the tone jump will also be produced in not only the film producing process, but also the converting process, the printing plate producing process, and the printing process.

FIG. 17A of the accompanying drawings shows the relationship between gradation image data and halftone-dot area percentages in the film producing process. FIG. 17B of the accompanying drawings shows the relationship between halftone-dot area percentages on a film and halftone-dot area percentages on a positive film in the film converting process. FIG. 17C of the accompanying drawings shows the relationship between halftone-dot area percentages on a positive film and halftone-dot area percentages on printing plate in the printing plate producing process. FIG. 17D of the accompanying drawings shows the relationship between halftone-dot area percentages on a printing plate and halftone-dot area percentages on a printed document in the printing process. FIG. 17E of the accompanying drawings shows the relationship between gradation image data and halftone-dot area percentages on a printed document, the relationship being representative of an accumulation of the relationships shown in FIGS. 17A through 17D.

The relationship between outputted halftone-dot area percentages and desired halftone-dot area percentages differs depending on output machine conditions, halftone attributes, etc., e.g., whether a halftone-dot image is to be outputted to a film as a recording medium by a laser beam, whether a negative film is to be converted to a positive film, whether a printing plate is to be produced, whether a halftone-dot image is to be printed with ink, and other conditions including a screen ruling, a screen angle, a halftone dot shape. As shown in each of FIGS. 17A through 17E, if the relationship between input data and output data is nonlinear, then the nonlinear relationships in the various processes ranging from the film producing process to the printing process are accumulated, as shown in FIG. 17E, resulting in a tone jump that is greatly noticeable to view.

Prior attempts to prevent such tone jumps include a method of correcting halftone-dot image data and an image processing apparatus with a correcting function as disclosed in Japanese laid-open patent publication No. 6-303429, an image data processing apparatus as disclosed in Japanese laid-open patent publication No. 7-336536, and an image data processing apparatus as disclosed in Japanese laid-open patent publication No. 8-98025.

According to the disclosed image data processing techniques, in an image output process up to a desired process for preventing a tone jump, an image carrying a plurality of test patches is outputted as a reference corresponding a plurality of halftone-dot area percentage data, the test patches are measured by a densitometer or a halftone-dot area meter, and a corrective curve is determined on the basis of the measured values. Using the corrective curve, the gradation of inputted gradation image data or threshold data is corrected in order to produce correct output gradations.

The above disclosed image data processing techniques are advantageous in that they are capable of outputting halftone-dot images having gradation characteristics free of tone jumps.

SUMMARY OF THE INVENTION

It is therefore an object of the present invention to provide a method of generating gradation-corrected image data, a method of generating gradation-corrected halftone dot percentage data, a method of generating gradation-corrected threshold data, and an image output apparatus, which do not need to output test patches, require neither densitometer nor halftone-dot area meter to be used, and are capable of easily and quickly correcting gradations with high accuracy.

Another object of the present invention is to provide a method of calculating an amount of exposure easily at each point of exposure on a recording medium.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 17A is a diagram showing the relationship between input and output data with no proofing or correction effected in a film producing process;

FIG. 17B is a diagram showing the relationship between input and output data with no proofing or correction effected in a film converting process;

FIG. 17C is a diagram showing the relationship between input and output data with no proofing or correction effected in a printing plate producing process;

FIG. 17D is a diagram showing the relationship between input and output data with no proofing or correction effected in a printing process; and FIG. 17E is a diagram showing an accumulation of the relationships illustrated in FIGS. 17A through 17D.

DETAILED DESCRIPTION OF THE PREFERRED EMBODIMENTS

Figure 2:
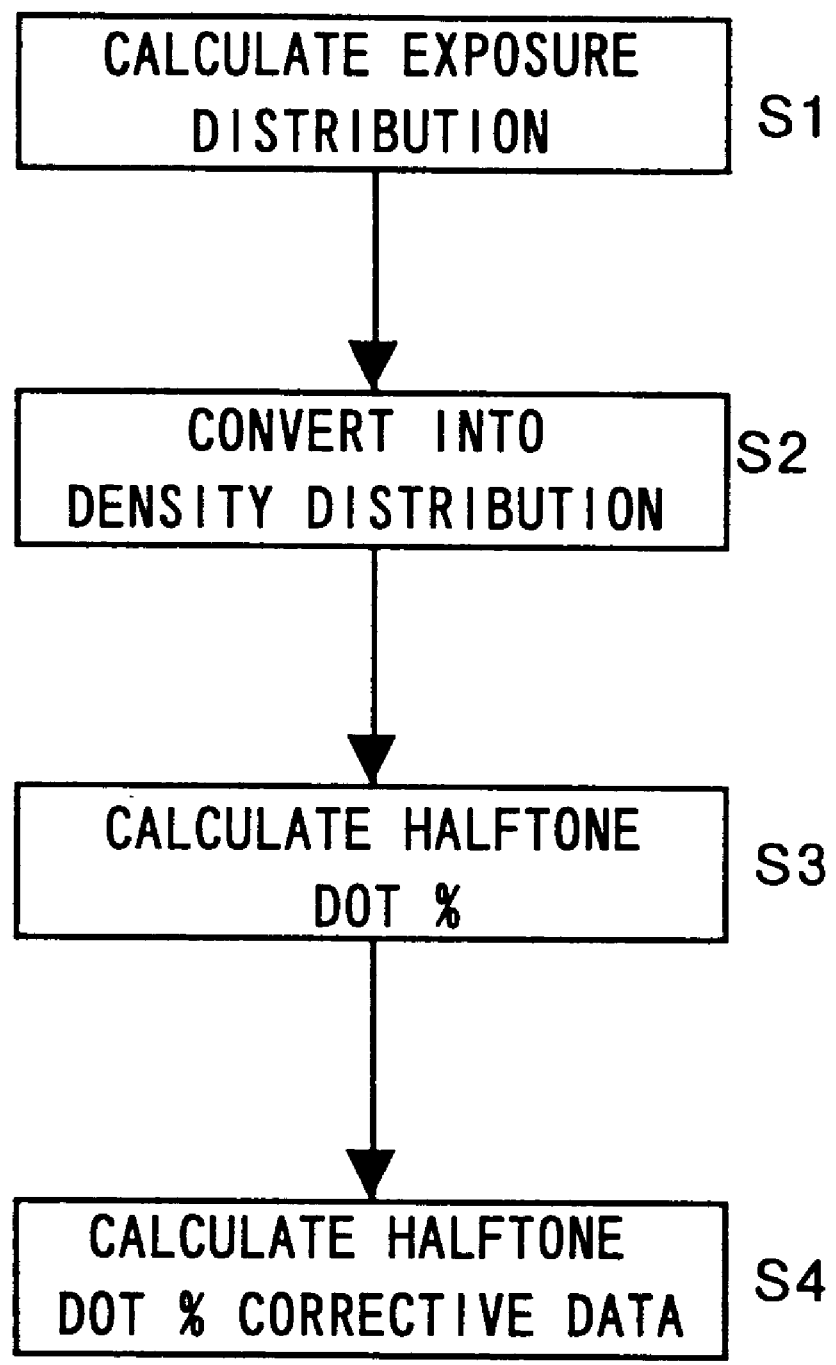
FIG. 2 is a flowchart of a process of calculating a gradation-corrected curve.
Figure 15:
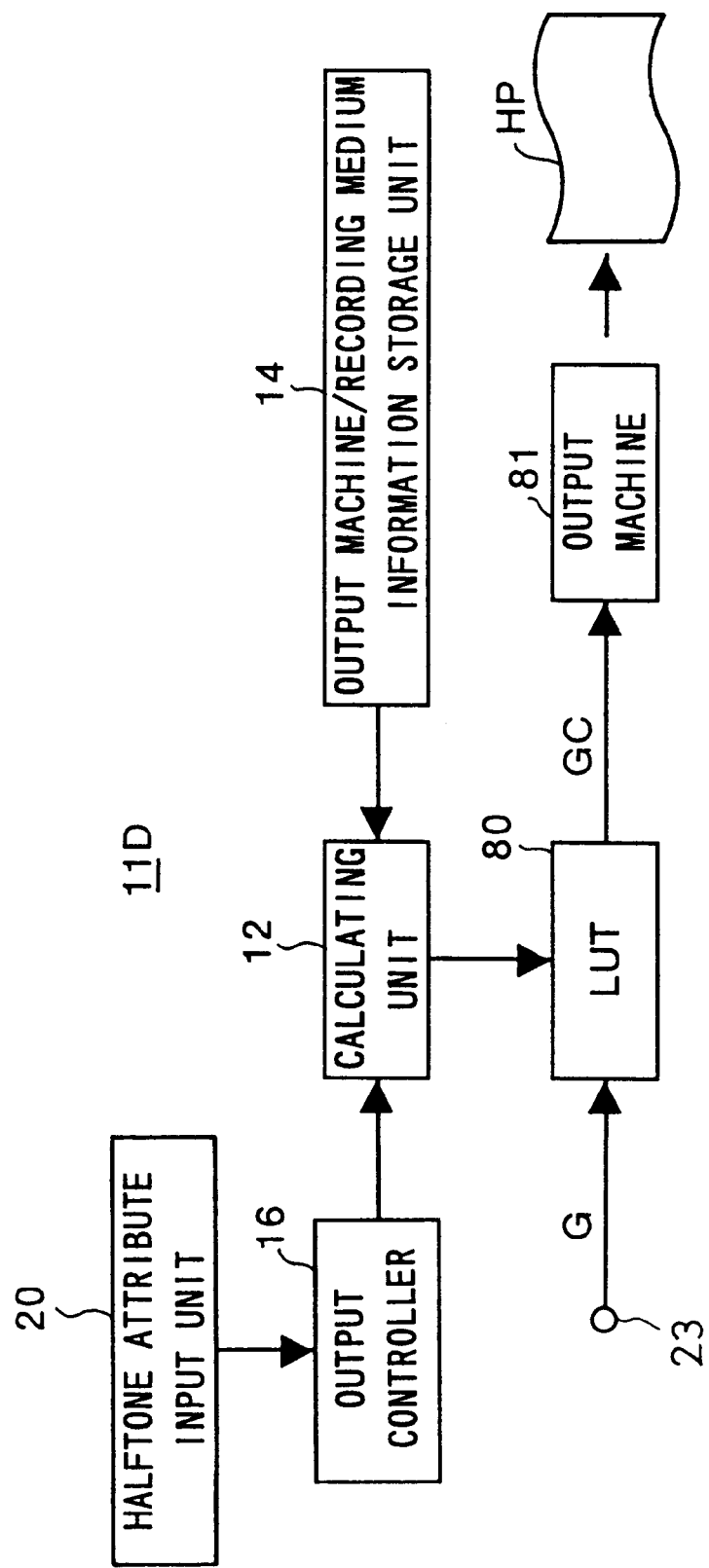
FIG. 15 is a block diagram of an image output apparatus according to a further embodiment of the present invention.
Figure 16:
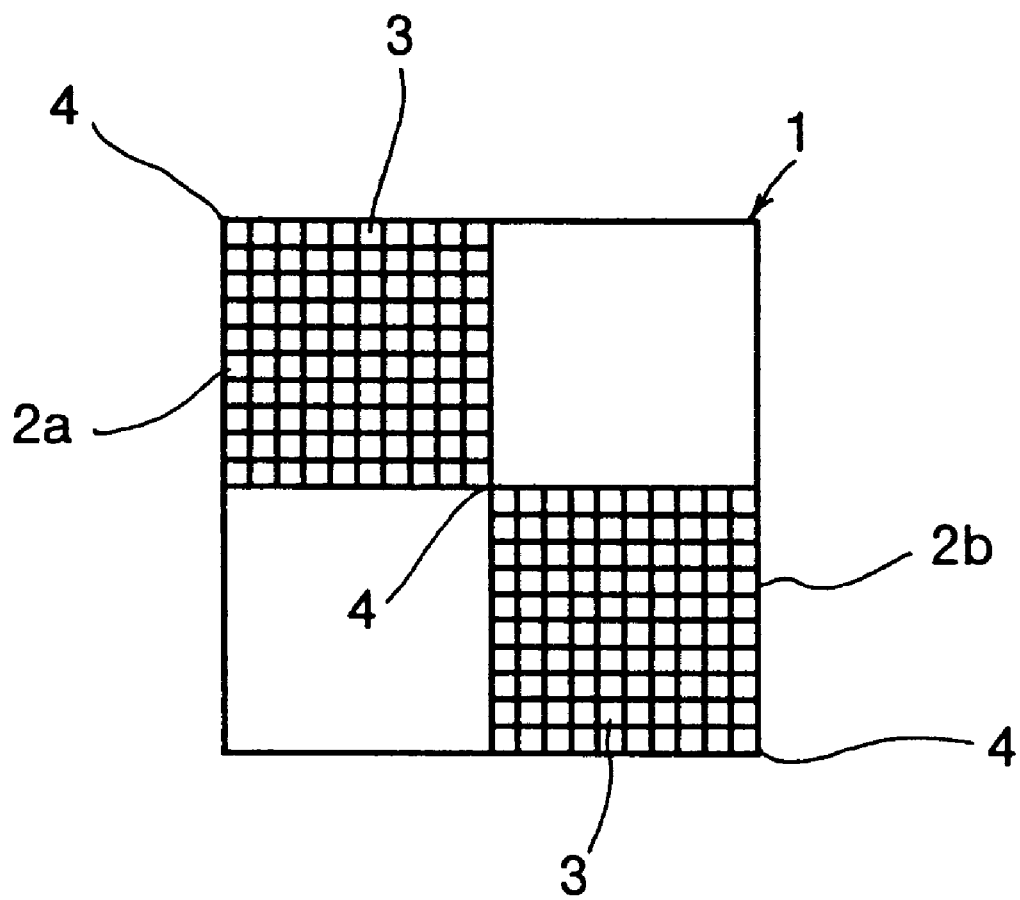
FIG. 16 is a diagram showing a halftone-dot image whose halftone-dot area percentage is 50%.

According to an aspect of the present invention, as shown in FIGS. 15 and 2, there is provided a method of generating gradation-corrected image data for use in recording a density gradation image on a recording medium HP based on input gradation image data G by converting the input gradation image data into gradation-corrected image data GC depending on conditions of an output machine 81 and thereafter scanning the recording medium in the output machine 81 with a light beam based on the gradation-corrected image data GC, comprising the steps of calculating an amount-of-exposure distribution to be imparted to the recording medium based on conditions of the output machine including a shape of recording dots corresponding to input gradations to be recorded on the recording medium and specification details of the light beam (step S1);

calculating a density distribution of an image to be recorded on the recording medium from the calculated amount-of-exposure distribution and characteristics of density with respect to an amount of exposure of the recording medium (step S2);

calculating output gradations to be actually recorded on the recording medium based on the calculated density distribution;

generating a characteristic curve of the calculated output gradations with respect to the input gradations (step S3);

generating a gradation corrective curve based on the characteristic curve (step S4); and converting the input gradation image data into the gradation-corrected image data according to the gradation corrective curve.

With the above aspect, it is possible to calculate a gradation corrective curve applicable to an output apparatus for outputting density gradation images.

Figure 13:
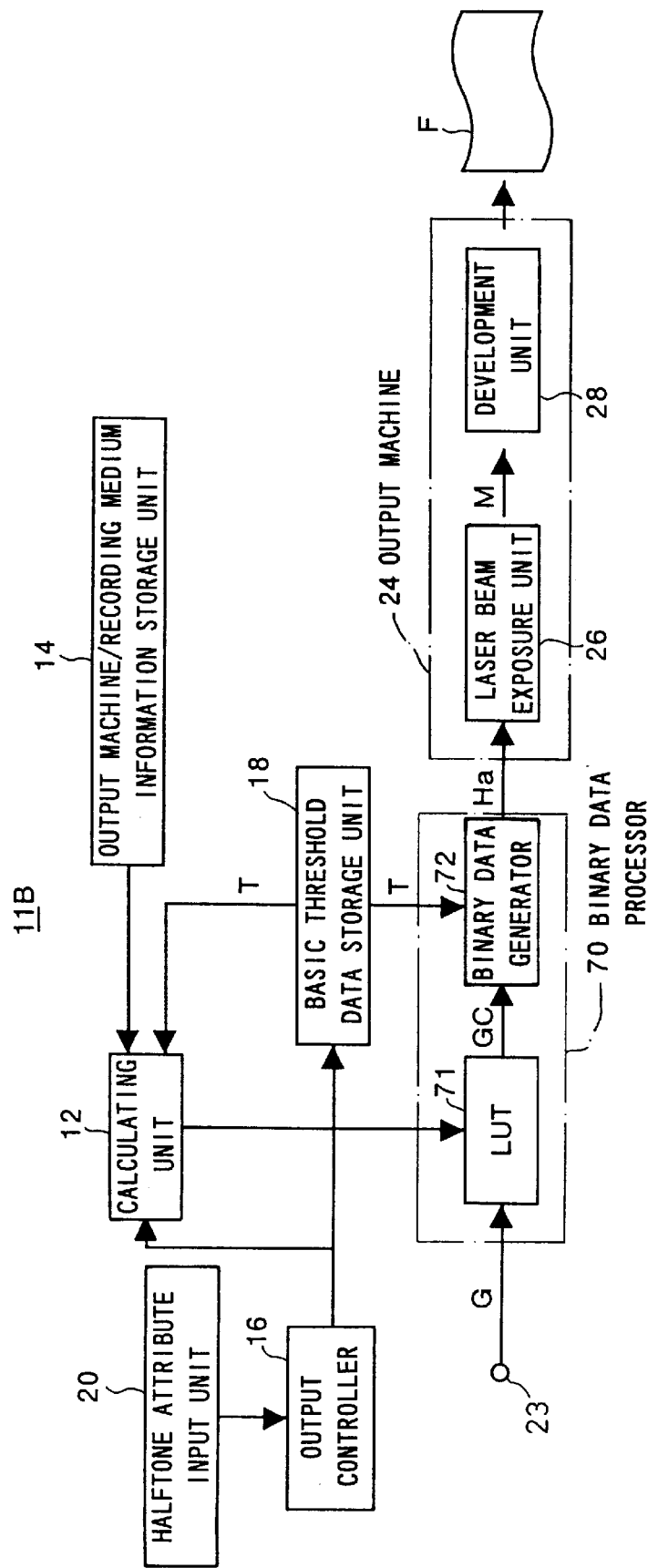
FIG. 13 is a block diagram of an image output apparatus according to still another embodiment of the present invention.

According to another aspect of the present invention, as shown in FIGS. 13 and 2, there is provided a method of generating gradation-corrected halftone dot percentage data for use in recording a halftone-dot image on a recording medium M based on input gradation image data G by converting the input gradation image data G into gradation-corrected halftone dot percentage data GC depending on conditions of an output machine 24, comparing the gradation-corrected halftone dot percentage data with threshold data T to produce binary data Ha, and thereafter scanning the recording medium in the output machine with a light beam modulated by the binary data Ha, comprising the steps of:

calculating an amount-of-exposure distribution to be imparted to the recording medium based on conditions of the output machine including a shape of halftone recording dots corresponding to input gradations to be recorded on the recording medium and specification details of the light beam (step S1);

calculating a density distribution of an image to be recorded on the recording medium from the calculated amount-of-exposure distribution and characteristics of density with respect to an amount of exposure of the recording medium (step S2);

calculating output halftone-dot percentage data to be actually recorded on the recording medium based on the calculated density distribution;

generating a characteristic curve of the calculated output halftone-dot percentage data with respect to the input gradations (step S3);

generating a gradation corrective curve based on the characteristic curve (step S4); and converting the input gradation image data into the gradation-corrected halftone-dot percentage data according to the gradation corrective curve.

With the above aspect, it is possible to calculate a gradation corrective curve applicable to an output apparatus for outputting halftone-dot images.

Figure 1:
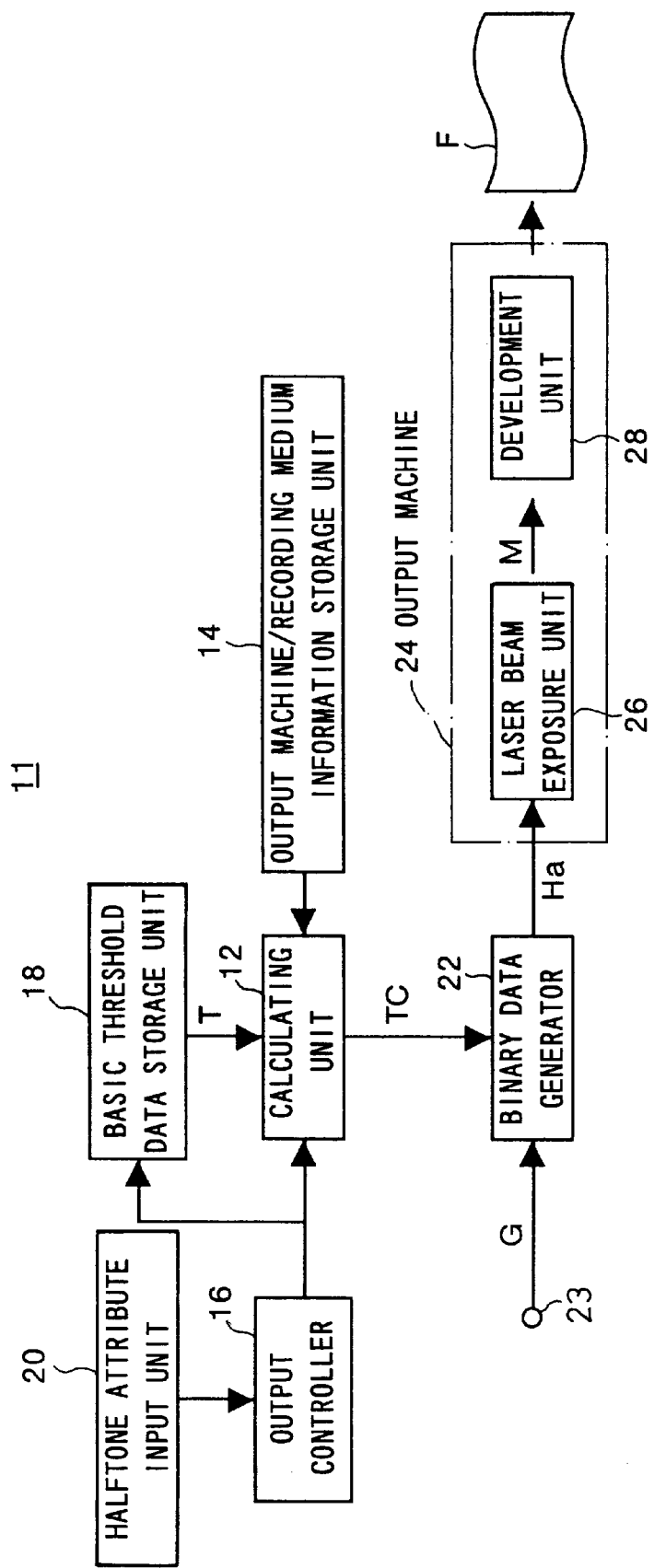
FIG. 1 is a block diagram of an image output apparatus according to an embodiment of the present invention.

According to still another aspect of the present invention, as shown in FIGS. 1 and 2, there is provided a method of generating gradation-corrected threshold data for use in recording a halftone-dot image on a recording medium M based on input gradation image data G by comparing the input gradation image data G with gradation-corrected threshold data TC depending on conditions of an output machine 24 to produce binary data Ha, and thereafter scanning the recording medium M in the output machine with a light beam modulated by the binary data Ha, comprising the steps of:

comparing input gradation data required to reproduce a full range of optical densities for the image on the recording medium with uncorrected threshold data to produce threshold correcting binary data;

calculating an amount-of-exposure distribution to be imparted to the recording medium based on conditions of the output machine including a shape of halftone recording dots to be recorded on the recording medium, produced based on the threshold correcting binary data, and specification details of the light beam (step S2);

calculating a density distribution of an image to be recorded on the recording medium from the calculated amount-of-exposure distribution and characteristics of density with respect to an amount of exposure of the recording medium (step S2);

calculating output halftone-dot percentage data to be actually recorded on the recording medium based on the calculated density distribution;

generating a characteristic curve of the calculated output halftone-dot percentage data with respect to the uncorrected threshold data (step S3);

generating a gradation corrective curve based on the characteristic curve (step S4); and generating the gradation-corrected threshold data by correcting a threshold of the uncorrected threshold data according to the gradation corrective curve.

With the above aspect, it is possible to calculate gradation-corrected threshold data applicable to an output apparatus for outputting halftone-dot images.

According to yet still another aspect of the present invention, as shown in FIG. 13, there is provided an image output apparatus comprising:

a halftone attribute specifying unit 20 for specifying attributes of a halftone-dot image to be outputted;

a calculating unit 12 for calculating gradation correcting data based on the specified attributes, threshold data T corresponding thereto, output machine information, and recording medium information;

a gradating corrector 71 for correcting supplied gradation image data with the gradation correcting data to output corrected gradation image data;

a binary signal processor 70 for comparing the corrected gradation image data GC with the threshold data T to generate binary data Ha; and an output machine 24 for scanning the recording medium with a light beam based on the binary data to record a halftone-dot image on the recording medium;

the calculating unit 12 comprising means for calculating an amount-of-exposure distribution to be imparted to the recording medium based on a shape of halftone recording dots as the attributes to be recorded on the recording medium, specification details of the light beam as the output machine information, and the threshold data, calculating a density distribution of an image to be recorded on the recording medium from the calculated amount-of-exposure distribution and characteristics of density with respect to an amount of exposure of the recording medium, calculating halftone-dot percentage data to be actually recorded on the recording medium based on the calculated density distribution, generating a characteristic curve of the calculated output halftone-dot percentage data with respect to the threshold data, generating a gradation corrective curve based on the characteristic curve, and generating the gradation correcting threshold data for correcting the gradations of the gradation image data according to the gradation corrective curve.

With the above aspect, it is possible to calculate gradation correcting threshold data (gradation correcting curve) applicable to an output apparatus for outputting halftone-dot images.

Figure 14:
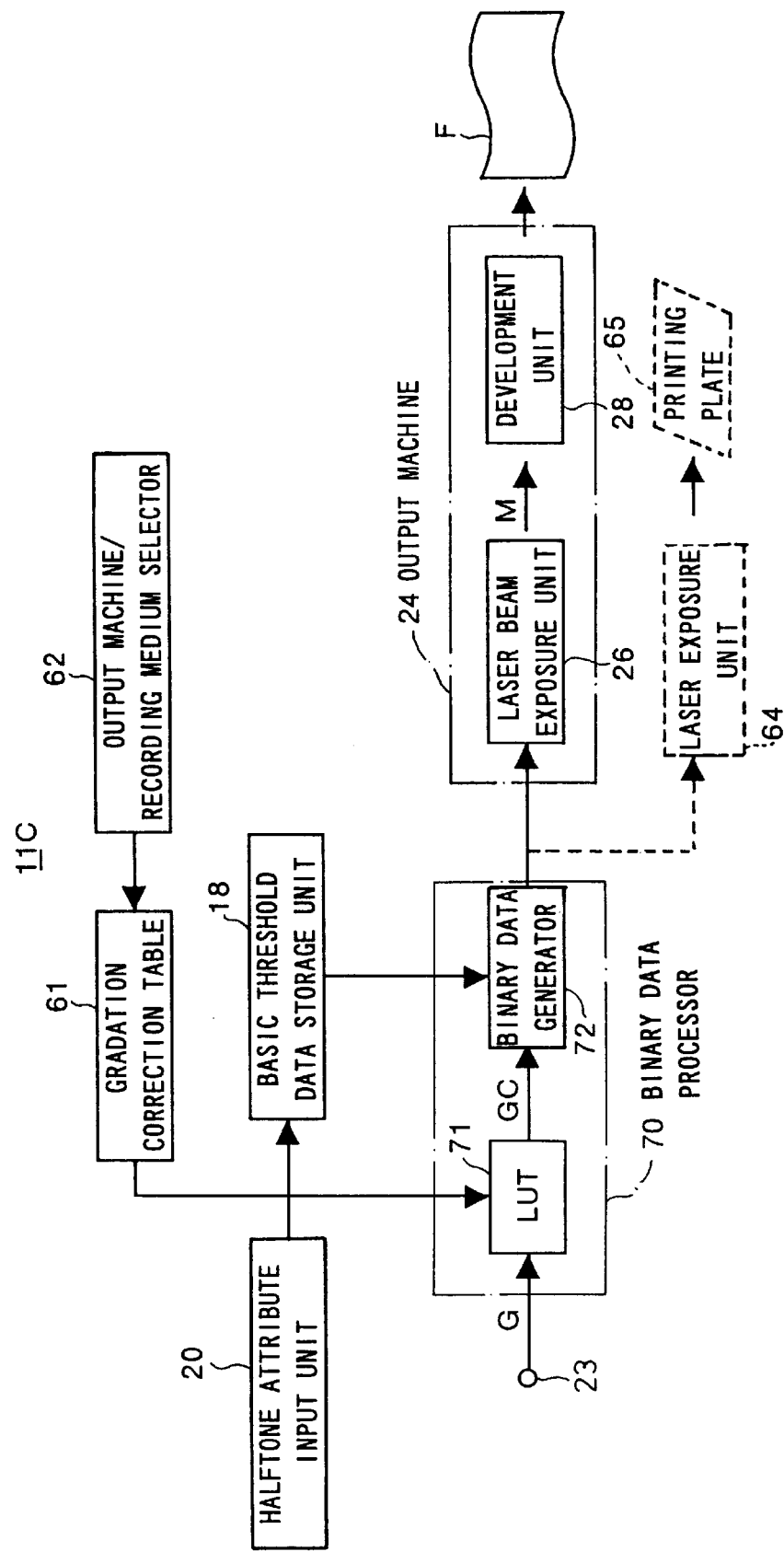
FIG. 14 is a block diagram of an image output apparatus according to yet still another embodiment of the present invention.

According to a further aspect of the present invention, as shown in FIG. 14, there is provided an image output apparatus comprising:

a halftone attribute specifying unit 20 for specifying attributes of a halftone-dot image to be outputted;

a storage unit 61 for storing gradation correcting data calculated based on the specified attributes, threshold data corresponding thereto, output machine information, and recording medium information;

a gradation corrector 71 for correcting supplied gradation image data with the gradation correcting data read from the storage unit to output corrected gradation image data GC;

a binary signal generator 72 for comparing the corrected gradation image data with threshold data to generate binary data; and an output machine 24 for scanning a recording medium with a light beam based on the binary data to record a halftone-dot image on the recording medium;

wherein the gradation correcting data stored in the storage unit 61 is produced by calculating an amount-of-exposure distribution to be imparted to the recording medium based on a shape of halftone recording dots as the attributes to be recorded on the recording medium, specification details of the light beam as the output machine information, and the threshold data, calculating a density distribution of an image to be recorded on the recording medium from the calculated amount-of-exposure distribution and characteristics of density with respect to an amount of exposure of the recording medium, calculating halftone-dot percentage data to be actually recorded on the recording medium based on the calculated density distribution, generating a characteristic curve of the calculated output halftone-dot percentage data with respect to the threshold data, generating a gradation corrective curve based on the characteristic curve, and using the gradation corrective curve the gradation correcting data.

With the above aspect, it is possible to calculate gradation-corrected threshold data from inputted image data in a short period of time because it is not necessary to calculate a gradation corrective curve for each output machine 24 or the like.

According to a still further aspect of the present invention, as shown in FIG. 1, there is provided an image output apparatus comprising:

a halftone attribute specifying unit 20 for specifying attributes of a halftone-dot image to be outputted;

a calculating unit 12 for calculating gradation-corrected threshold data TC based on the specified attributes, uncorrected threshold data T corresponding thereto, output machine information, and recording medium information;

a binary signal generator 22 for comparing supplied image data G with the gradation-corrected threshold data TC to generate binary data Ha; and an output machine 24 for scanning a recording medium with a light beam based on the binary data to record a halftone-dot image on the recording medium ;

the calculating unit 12 comprising means for calculating an amount-of-exposure distribution to be imparted to the recording medium based on a shape of halftone recording dots as the attributes to be recorded on the recording medium, and specification details of the light beam as the output machine information, calculating a density distribution of an image to be recorded on the recording medium from the calculated amount-of-exposure distribution and characteristics of density with respect to an amount of exposure of the recording medium, calculating halftone-dot percentage data to be actually recorded on the recording medium based on the calculated density distribution, generating a characteristic curve of the calculated output halftone-dot percentage data with respect to the uncorrected threshold data, generating a gradation corrective curve based on the characteristic curve, and generating the gradation-corrected threshold data from the uncorrected threshold data according to the gradation corrective curve.

With the above aspect, it is possible to calculate gradation-corrected threshold data applicable to an output apparatus for outputting halftone-dot images.

Figure 12:
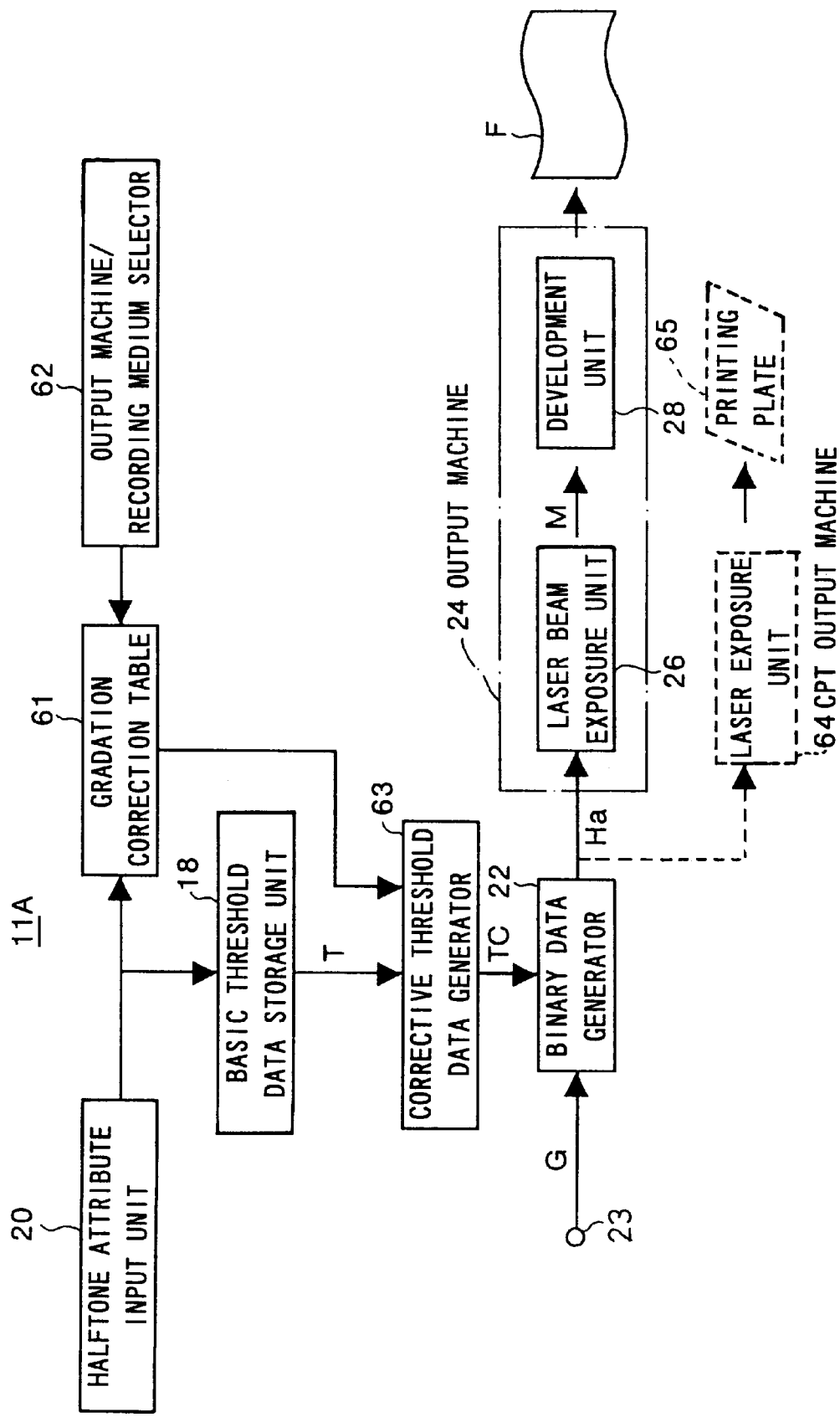
FIG. 12 is a block diagram of an image output apparatus according to another embodiment of the present invention.

According to a yet still further aspect of the present invention, as shown in FIG. 12, there is provided an image output apparatus comprising:

a halftone attribute specifying unit 20 for specifying attributes of a halftone-dot image to be outputted;

a storage unit 61 for storing gradation-corrected threshold data calculated based on the specified attributes, uncorrected threshold data corresponding thereto, output machine information, and recording medium information;

a binary signal generator 22 for comparing supplied threshold image data G with the gradation-corrected threshold data read from the storage unit 61 to generate binary data; and an output machine 24 for scanning a recording medium with a light beam based on the binary data to record a halftone-dot image on the recording medium;

wherein the gradation-corrected threshold data stored in the storage unit 61 is produced by calculating an amount-of-exposure distribution to be imparted to the recording medium based on a shape of halftone recording dots as the attributes to be recorded on the recording medium, and specification details of the light beam as the output machine information, calculating a density distribution of an image to be recorded on the recording medium from the calculated amount-of-exposure distribution and characteristics of density with respect to an amount of exposure of the recording medium, calculating halftone-dot percentage data to be actually recorded on the recording medium based on the calculated density distribution, generating a characteristic curve of the calculated output halftone-dot percentage data with respect to the threshold data, generating a gradation corrective curve based on the characteristic curve, and generating the gradation-corrected threshold data by correcting a threshold of the uncorrected threshold data according to the gradation corrective curve.

With the above aspect, it is possible to calculate gradation-corrected data from inputted image data in a relatively short period of time because it is not necessary to calculate a gradation corrective curve for each output machine 24 or the like.

According to still another aspect of the present invention, as shown in FIG. 12, there is provided an image output apparatus comprising:

a halftone attribute specifying unit 20 for specifying attributes of a halftone-dot image to be outputted;

a threshold data storage unit 18 for outputting threshold data T corresponding to the specified attributes;

an output condition specifying unit 62 for specifying an item from output machine information and recording medium information, at least one of which contains a plurality of items;

a corrective characteristic storage unit 61 for storing a plurality of corrective characteristics of gradation-corrected threshold data with respect to the threshold data based on the attributes specified by the halftone attribute specifying unit, threshold data corresponding thereto, and the item of the output machine information and recording medium information which is specified by the output condition specifying unit;

a corrected threshold data generator 63 for outputting gradation-corrected threshold data TC produced by correcting the threshold data supplied from the threshold data storage unit with the corrective characteristics stored in the corrective characteristic storage unit;

a binary signal generator 22 for comparing inputted gradation image data G with the gradation-corrected threshold data TC to produce binary data 22; and an output machine 24 for generating a halftone-dot image based on the binary data and outputting the halftone-dot image to a recording medium M;

wherein the corrective characteristics stored in the corrective characteristic storage unit 61 are produced by calculating an amount-of-exposure distribution to be imparted to the recording medium based on a shape of halftone recording dots as the attributes to be recorded on the recording medium, and specification details of the light beam as the output machine information, calculating a density distribution of an image to be recorded on the recording medium from the calculated amount-of-exposure distribution and characteristics of density with respect to an amount of exposure of the recording medium, calculating halftone-dot percentage data to be actually recorded on the recording medium based on the calculated density distribution, generating a characteristic curve of the calculated output halftone-dot percentage data with respect to the threshold data, and generating the corrective characteristics based on the characteristic curve.

With the above aspect, it is possible to generate desired gradation-corrected threshold data corresponding to each of various output machines.

Figure 5:
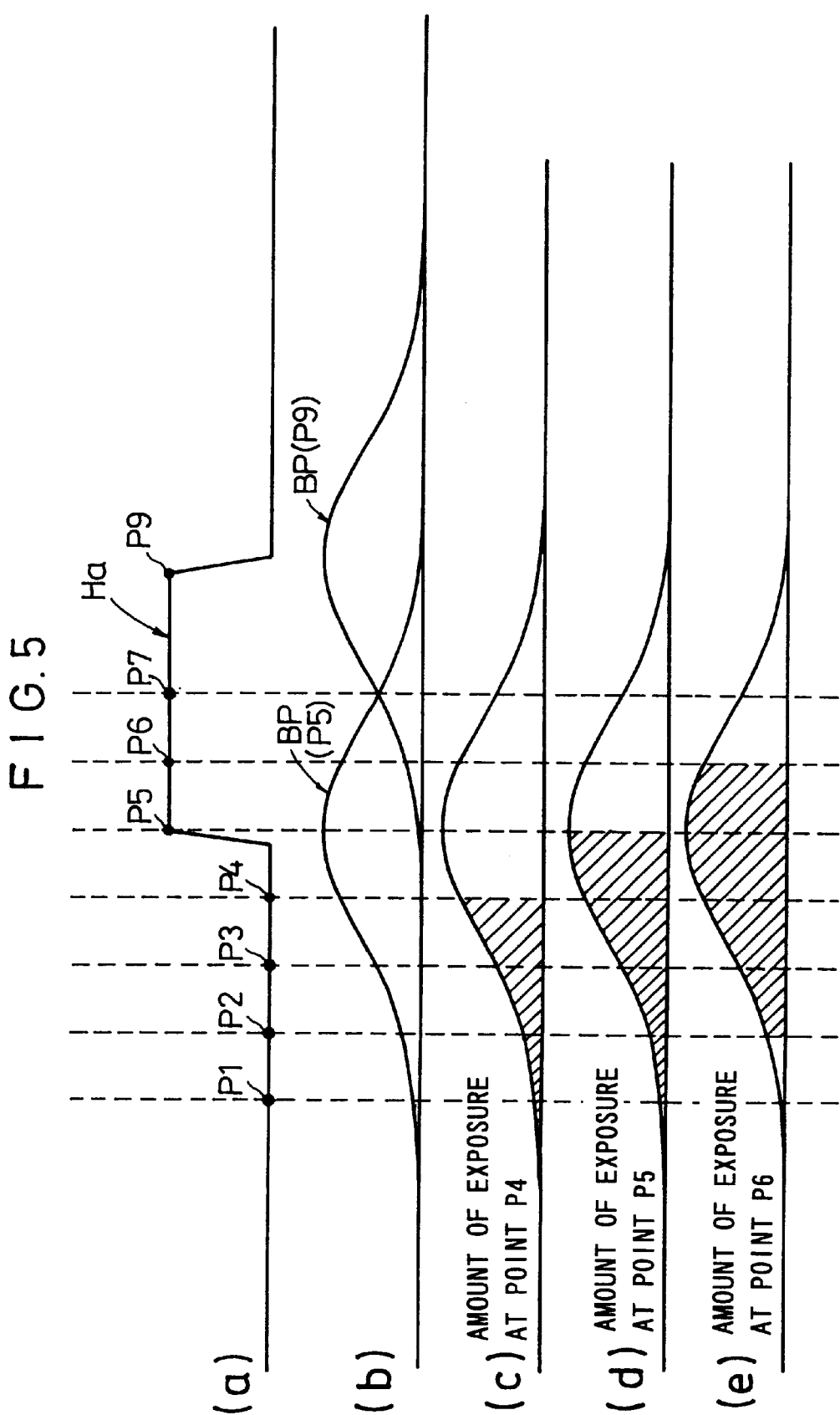
FIG. 5 is a diagram illustrative of a process of calculating an amount of exposure.

According to yet still another aspect of the present invention, as shown in FIG. 5, there is provided a method of calculating an amount of exposure to be applied to a recording medium by a laser beam modulated by binary image data, comprising the steps of:

turning on a laser beam BP at a point P5 of transition of binary image data Ha from a low level to a high level, keeping the laser beam on during a high-level interval of the binary image data, and turning off the laser beam at a point P9 of transition of the binary image data from the high level to the low level; and integrating an amount of exposure determined from a configuration of the laser beam in a period from generation to elimination of the laser beam, at each of exposure points on a recording medium which correspond respectively to points of the binary image data, and calculating the integrated amount of exposure as an amount of exposure at each of the exposure points on the recording medium.

With the above aspect, it is possible to calculate easily an amount of exposure at each of the exposure points on the recording medium.

FIG. 1 shows in block form an image output apparatus 11 according to an embodiment of the present invention, which incorporates a method of generating gradation-corrected threshold data.

As shown in FIG. 1, the image output apparatus 11 has a calculating unit 12 for converting basic threshold data T outputted from a basic threshold data storage unit 18 controlled by an output controller 16 into 8-bit corrected threshold data (gradation-corrected threshold data) TC having values 0, 1, . . . , 255 with corrected gradations, based on output machine information and recording medium information supplied from an output machine/recording medium information storage unit 14 and halftone attribute information specified by a halftone attribute input unit 20 and supplied through the output controller 16.

The corrected threshold data TC is supplied from the calculating unit 12 to a reference input terminal of a binary data generator 22 under the control of the output controller 16.

A comparison input terminal of the binary data generator 22 is supplied with 8-bit gradation image data (also referred to as input gradation image data, input image data, or image data) G having values 0, 1, . . . , 255, for example, as density data, from an input terminal 23.

The binary data generator 22 compares the gradation image data G supplied to the comparison input terminal with the corrected threshold data TC supplied to the reference input terminal, and supplies binary image data (also referred to as binary data, halftone-dot image data, digital halftone data, or digital halftone-dot data) Ha (which is ON or "1" for blackening a pixel when G>TC and OFF or "0" for non-blackening a pixel when G≦TC) to an output machine 24.

The output machine 24 basically comprises a laser beam exposure unit 26 and a developing unit 28. The laser beam exposure unit 26 scans a recording medium M which comprises a photosensitive medium such as a sheet coated with a photosensitive material with a laser beam, which is turned on and off, i.e., modulated, by the supplied binary image data Ha, in a main scanning direction while the photosensitive medium M is being fed in an auxiliary scanning direction, for thereby forming a two-dimensional latent image on the photosensitive medium M. The latent image on the photosensitive medium M is then developed into a visible halftone-dot image by the developing unit 28. The output machine 24 thus outputs a film F which carries the visible halftone-dot image.

The halftone attribute information specified by the halftone attribute input unit 20 represents a halftone dot shape (halftone dot type), a screen ruling, a screen angle, and an output resolution for an image to be formed on the film F. The output machine information supplied from the output machine/recording medium information storage unit 14 represents laser beam specification details including a laser beam diameter, a laser beam intensity, a laser beam configuration, etc. of a recording (writing) laser beam used in the laser beam exposure unit 26. The recording medium information supplied from the output machine/recording medium information storage unit 14 represents amount-of-exposure vs. density characteristic information (generally referred to as photosensitive material characteristic curve) of the photosensitive medium M which is scanned by the laser beam.

Operation of the image output apparatus 11 (mainly a processing sequence of the calculating unit 12) shown in FIG. 1 will be described below with reference to FIG. 2.

In a step S1, the calculating unit 12 calculates an amount-of-exposure distribution (energy distribution) given to the photosensitive medium M, i.e., the film F before being developed, per halftone-dot unit region (per repetitive halftone-dot unit or unit halftone dot region) based on the shape of a dot (ideal digital halftone-dot shape) to be recorded on the photosensitive medium M in the laser beam exposure unit 26 by the laser beam and the laser beam configuration (laser beam diameter).

Figure 3:
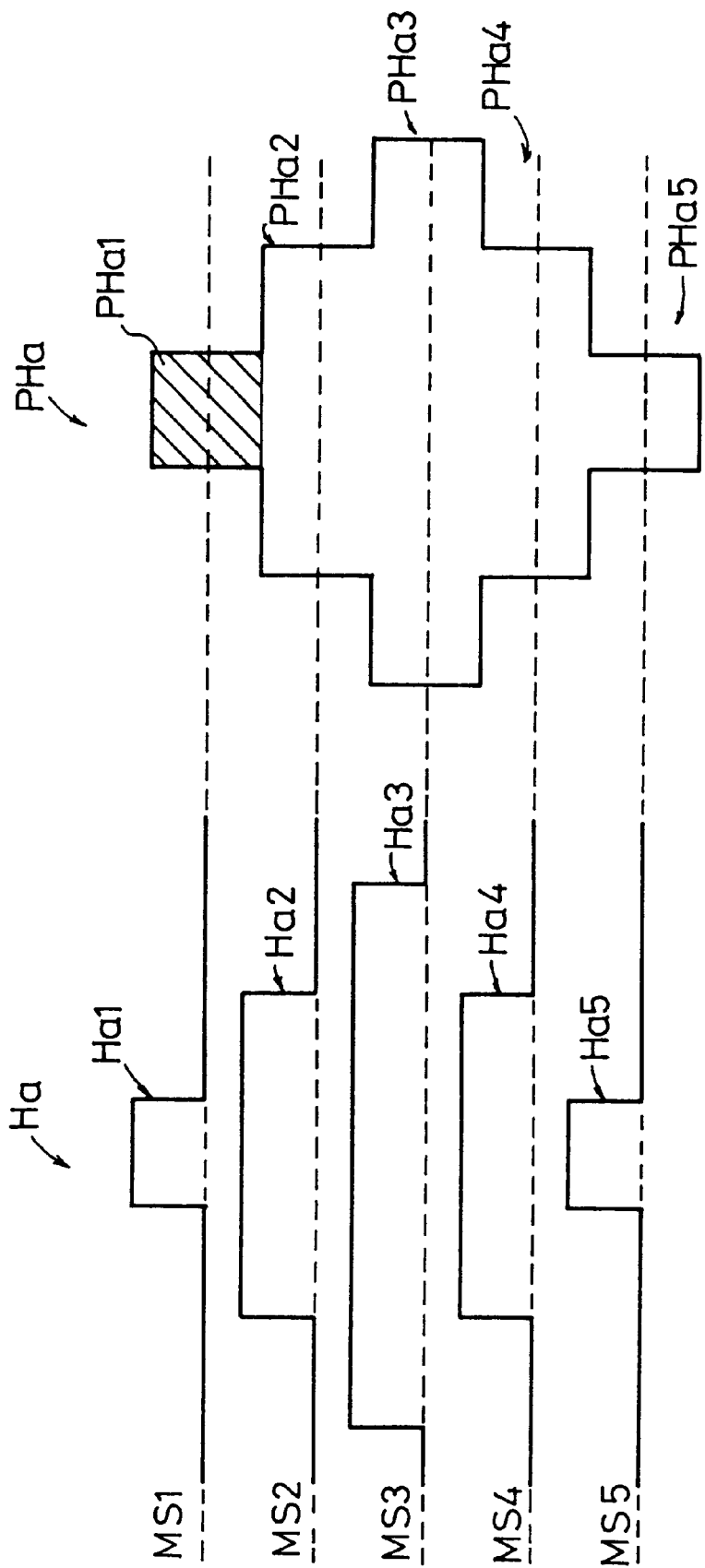
FIG. 3 is a diagram illustrative of the relationship between binary data and a digital halftone dot.

FIG. 3 shows on the right-hand side the shape of a halftone dot (recorded dot shape) PHa having a value 13, for example, per halftone-dot unit region, to be formed (recorded) as a latent image on the photosensitive medium M, and on the left-hand side waveforms of binary image data Ha for turning on and off a laser beam to produce the halftone dot. In FIG. 3, the halftone dot is formed on five main scanning lines MS1 through MS5. On the uppermost first main scanning line MS1, a halftone-dot shape PHa1, shown hatched, having a value 1 is formed by binary image data Ha1. On the second through fifth main scanning lines MS2~MS5, halftone-dot shapes PHa2~PHa5 having respective values 3, 5, 3, 1 are formed by binary image data Ha2~Ha5. The halftone-dot shapes PHa1~PHa5 as a whole make up the halftone dot PHa having a value 13 per halftone-dot unit region.

In FIG. 3, the horizontal axis for the binary image data Ha is considered as a positional axis corresponding to the coordinates of the halftone-dot shapes PHa1~PHa5.

The binary image data Ha is calculated by the calculating unit 12. The binary image data Ha has a binary signal generator (not shown) which produces the binary image data Ha by comparing the basic threshold data T having 8-bit gradations or more (e.g., 256 gradations of 0, 1, . . . , 255 or 1024 gradations of 0, 1, . . . , 1023) with 8-bit continuous gradation data (256 gradations of 0, 1, . . . , 255) which correspond to the gradation image data G supplied through the input terminal 23 to the binary signal generator 22 and which are stored in the calculating unit 12.

Figure 4:
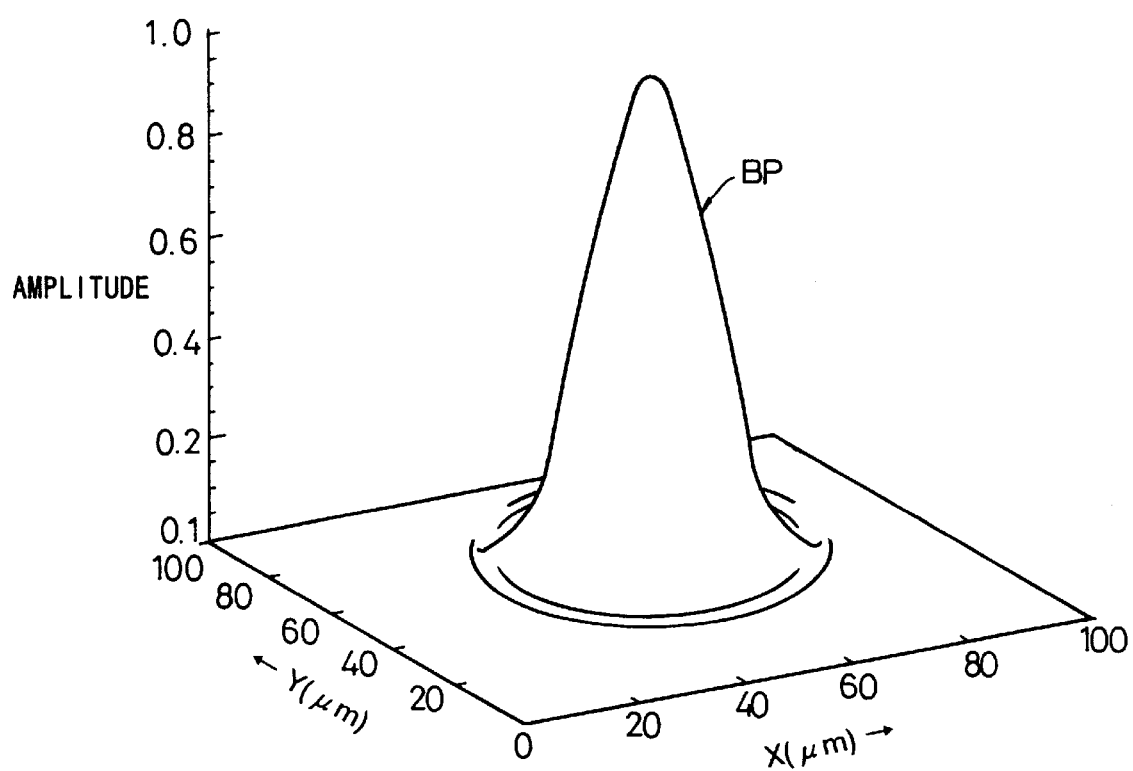
FIG. 4 is a diagram illustrative of a laser beam configuration.

FIG. 4 shows a simulated configuration of a laser beam BP used in the calculating unit 12. The laser beam BP has a Gaussian distribution in a region having a size of 100 m 100 m. In FIG. 4, the beam diameter of the laser beam BP as defined by $1/e^2$ (e is the base of a natural logarithm) of the maximum amplitude which is set to 1.0.

FIG. 5 is illustrative of calculations of the amount of exposure based on the binary image data Ha. As shown at (a) in FIG. 5, the laser beam is generated at a point P5 where the binary image data Ha has a positive-going edge (see BP(P5) at (b) in FIG. 5), and is eliminated at a point P9 where the binary image data Ha has a negative-going edge (see BP(P9)

at (b) in FIG. 5). Stated otherwise, the laser beam BP looks as if moving in a direction from the left to the right on the photosensitive medium M.

It is to be noted that when the laser beam BP is generated at the point P5 (BP(P5)), the photosensitive medium M is exposed to the power at a skirt of the laser beam BP(P5) at points P1~P4.

The amount of exposure at the point P4 is equal to an integrated value of a hatched area shown at (c) in FIG. 5. The amount of exposure at the point P5 is equal to an integrated value of a hatched area from the point P1 to the point (P5) shown at (d) in FIG. 5. The amount of exposure at the point P6 is equal to an integrated value of a hatched area from the point P2 to the point (P6) shown at (e) in FIG. 5. The reason why the amount of exposure at the point P6 is equal to the integrated value of the hatched area shown at (e) in FIG. 5, i.e., the reason why the area from the point P1 to the point P2 is excluded, is that since the laser beam BP(P9) is eliminated at the negative-going edge at the point P9, no exposure is effected by the portion of the waveform of the laser beam BP(P9) which is to the left of the point P6 actually behind the point (P6).

In this manner, the calculating unit 12 calculates an amount-of-exposure distribution for each of the scanning lines MS1~MS5. Actually, when the laser beam BP is generated and eliminated at the positive- and negative-going edges of the binary image data Ha, stated otherwise, the laser drive signal, there are delays caused when the amplitude of the laser beam gradually increases or gradually decreases. Therefore, it is preferable to calculate the amount-of-exposure distribution taking such delays into account.

The calculating unit 12 then converts the amount-of-exposure distribution calculated in the step S1 into a density distribution in a step S2. Specifically, the density distribution is determined by referring to a characteristic curve used to develop the photosensitive medium M which carries a latent image formed by the amount of exposure provided by the laser beam BP having a desired laser wavelength, under developing conditions of the developing unit 28.

Figure 6:
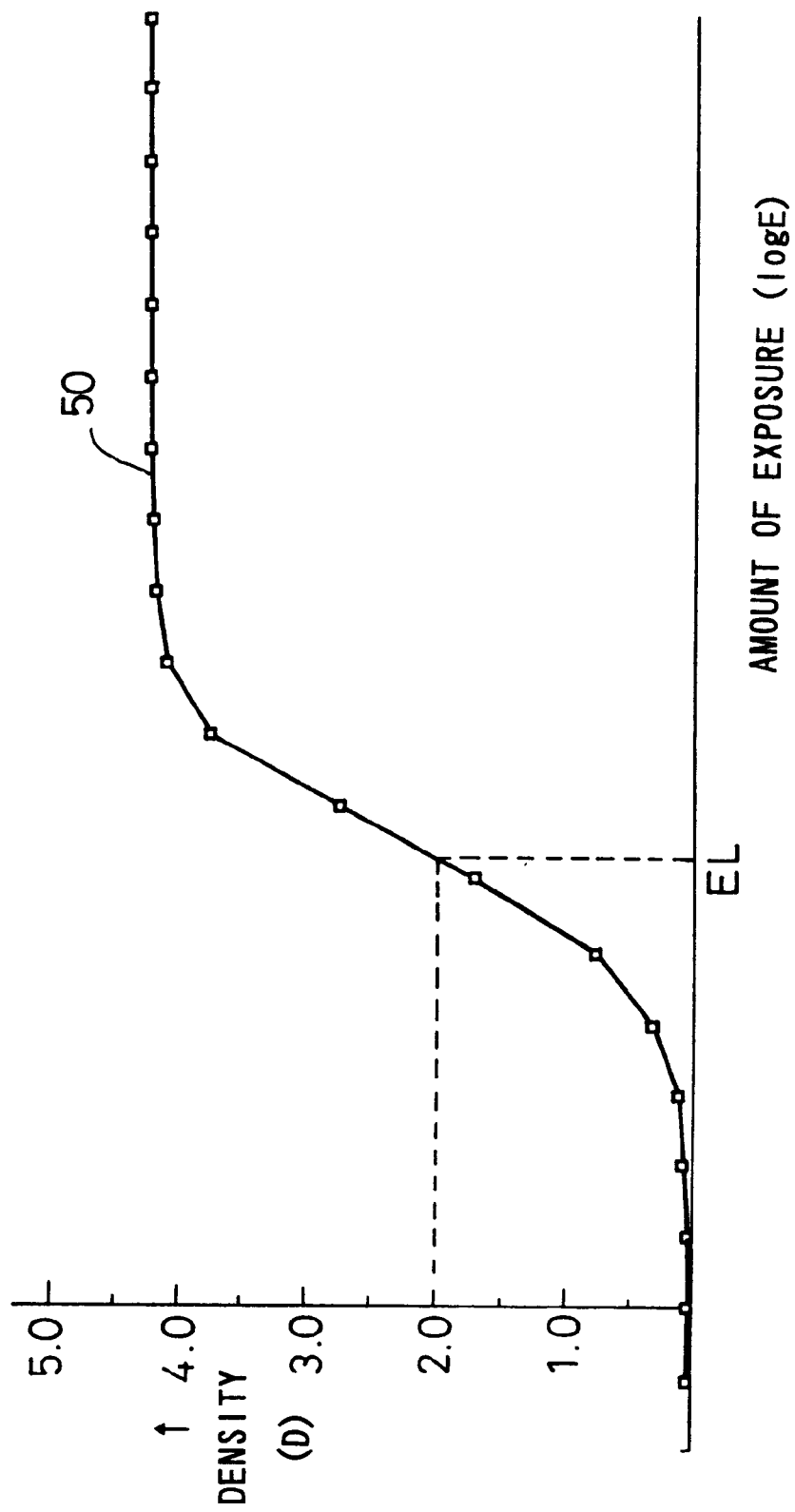
FIG. 6 is a diagram showing amount-of-exposure vs. density characteristics of a photosensitive material.

FIG. 6 shows a characteristic curve 50 {generally called a photosensitive medium characteristic (γ characteristic) curve} of the density (D) with respect to the amount of exposure (logE).

The density distribution with respect to the amount-of-exposure distribution calculated in the step S1 can be determined from the characteristic curve 50. The characteristic curve 50 is stored in the output machine/recording medium information storage unit 14 (see FIG. 1). It can be seen from FIG. 6 that the density (D) has a value D=2.0 when the amount of exposure (logE) has a value EL.

Figure 7:
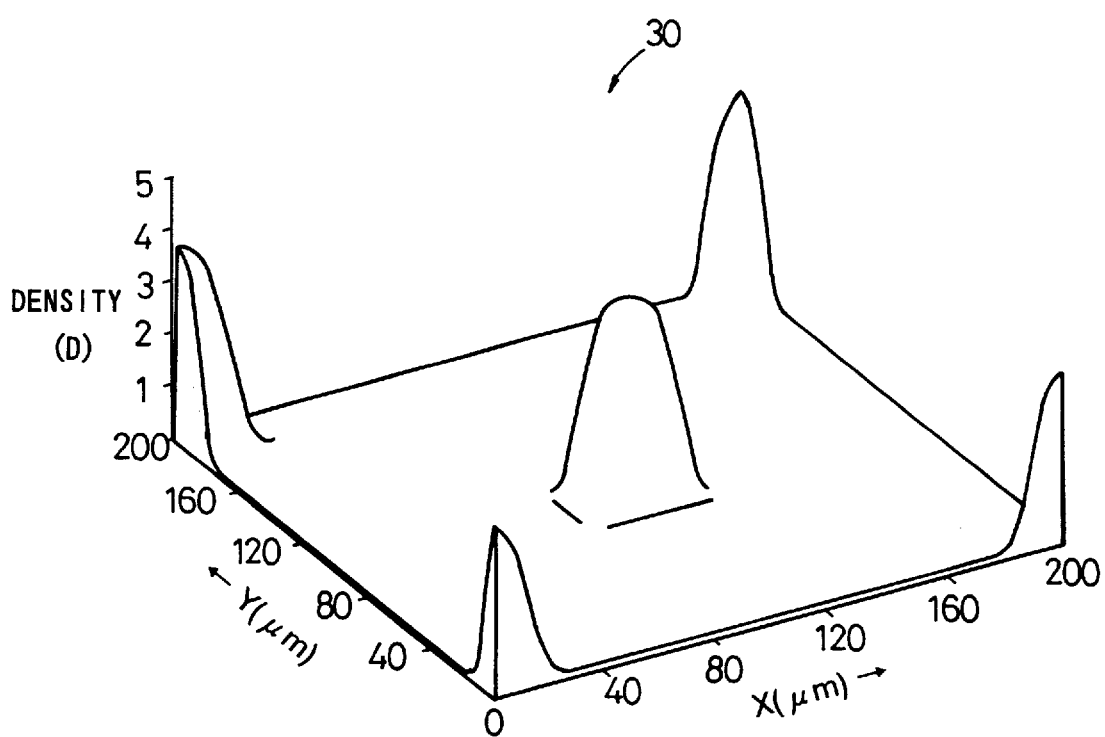
FIG. 7 is a diagram showing a density distribution at a halftone-dot percentage of 5%.

FIG. 7 shows a simulated density distribution 30 at a halftone-dot percentage of 5%, for example, in a unit halftone dot region whose size is 200 m 200 m when a density distribution is determined from an amount-of-exposure distribution as described above. In FIG. 7, the simulated density distribution 30 at the halftone-dot percentage of 5% contains densities being present in peripheral and central portions thereof.

Figure 8:
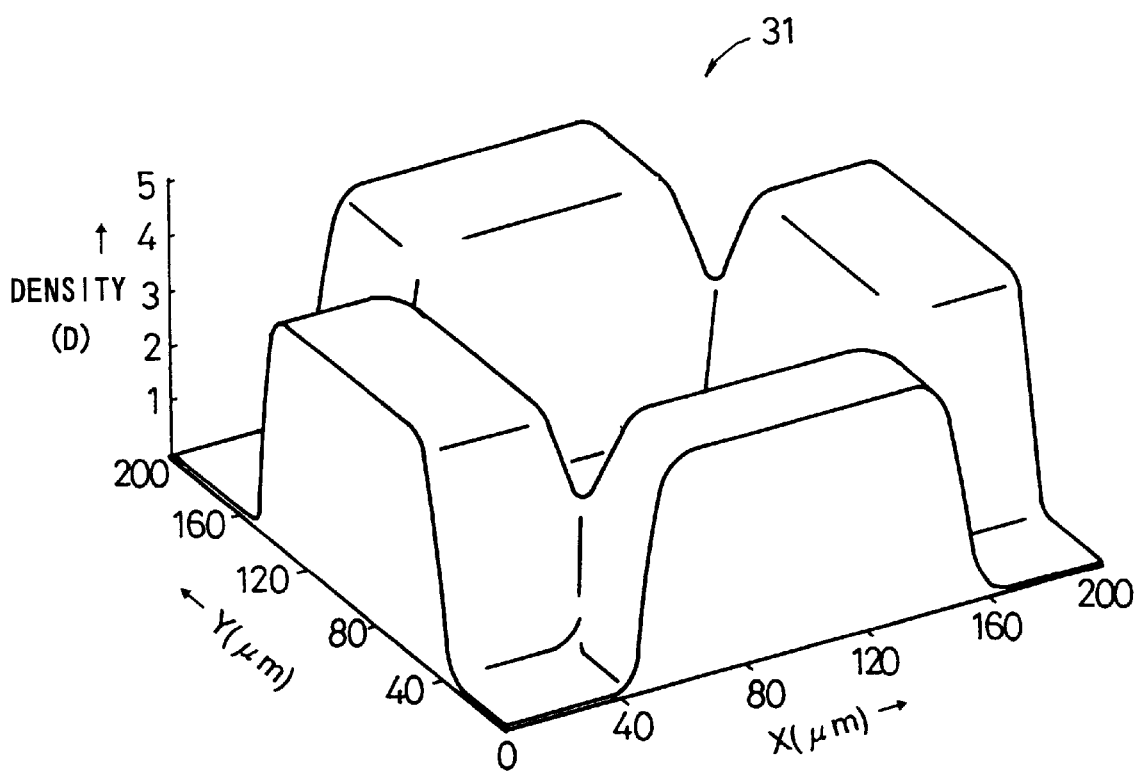
FIG. 8 is a diagram showing a density distribution at a halftone-dot percentage of 50%.

FIG. 8 shows a simulated density distribution 31 at a halftone-dot percentage of 50%.

Figure 9:
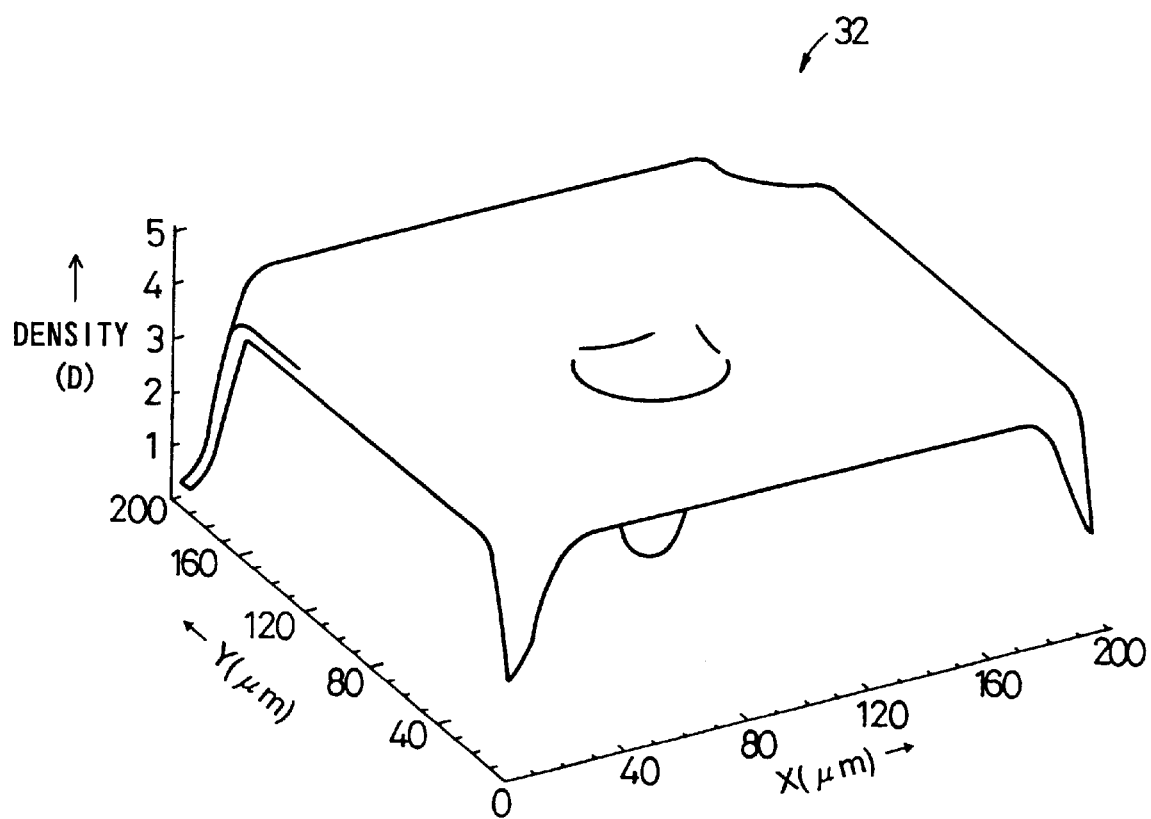
FIG. 9 is a diagram showing a density distribution at a halftone-dot percentage of 95%.

FIG. 9 shows a simulated density distribution 32 at a halftone-dot percentage of 95%.

At a halftone-dot percentage of 100%, a simulated density distribution represents a flat pattern with all densities having a value of 4 or more in the unit halftone dot region whose size is 200 m 200 m.

Actually, an average density distribution Dmean per unit halftone dot region is determined from the simulated density distributions 30~32.

Specifically, the average density distribution Dmean per unit halftone dot region is determined by calculating the transmittance TR of the density (D) at each coordinate point of the simulated density distributions 30~32 according to the equation $TR=10^{-D}$, determining an arithmetic mean of the transmittances TR of the coordinate points, and calculating a logarithm whose base is 10 of the arithmetic mean of the transmittances TR.

Then, the calculating unit 12 determines halftone-dot percentage data from the average density Dmean in a step S3. The halftone-dot percentage data can be calculated according to the equation (1), given below, which is a modification of the Murray Davis formula. The Murray Davis formula is stored in the calculating unit 12.

$$\text{Halftone-dot \%} = \{(1-10^{-Dmean})/(1-10^{-Dmax})\} \times 100 \quad (1)$$

where Dmax represents a solid density and usually is Dmax≧4 as described above.

It is thus possible to obtain a characteristic curve of output halftone-dot percentage {a value calculated according to the equation (1)} with respect to input halftone-dot percentage data converted from the basic threshold data T stored in the basic threshold data storage unit 18. When the basic threshold data T has values 0, 1, 2, ..., 255, the input halftone-dot percentage data has values 0, 0.39, 0.78, ..., 100 (%) produced by multiplying, by 100, quotients generated when the values of the basic threshold data T are divided by 255.

Figure 10:
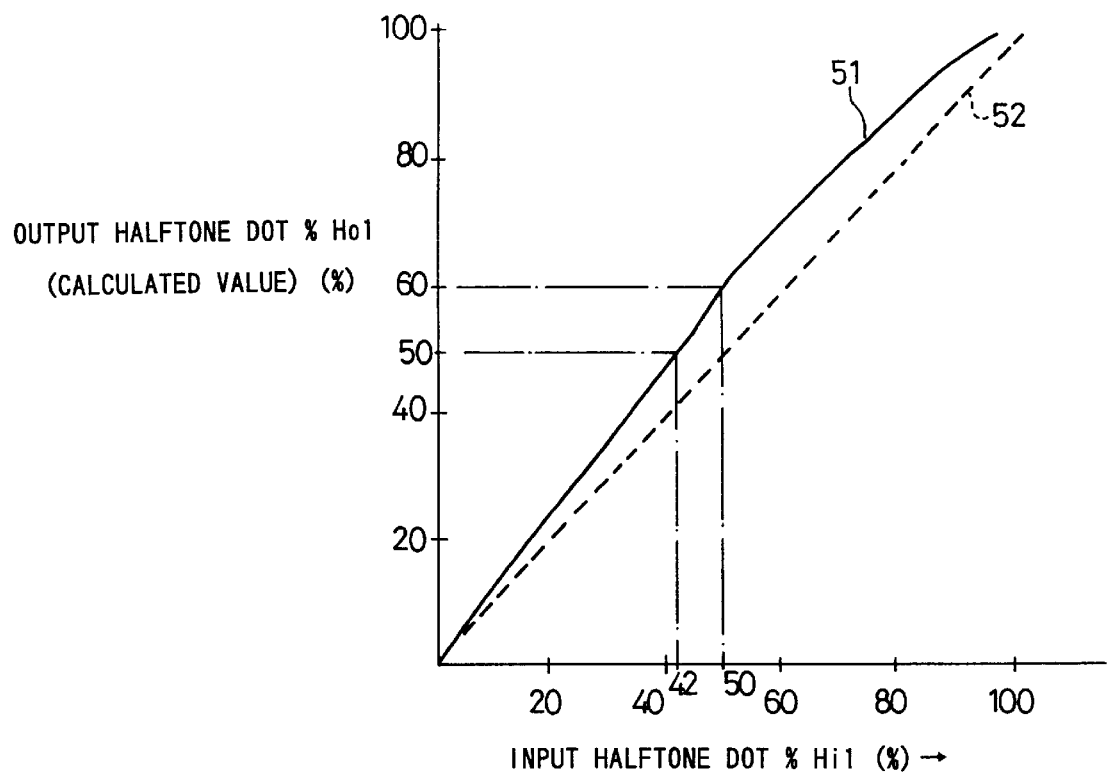
FIG. 10 is a diagram showing a calculated input/output gradation curve.

FIG. 10 shows such a characteristic curve 51 prior to being corrected as a solid-line curve. In this embodiment, input halftone-dot percentage data Hi1 and output halftone-dot percentage data Ho1 should preferably linearly related to each other as indicated by a characteristic curve 52. However, according to the characteristic curve 51, when input halftone-dot percentage data Hi1 is Hi1=50% (a value of 128 in terms of threshold data for 256 gradations), the calculated output halftone-dot percentage data Ho1 is Ho1=60%.

Therefore, a corrective curve is calculated which equalizes the output halftone-dot percentage data Ho1 to Ho1=50% when the input halftone-dot percentage data Hi1 is Hi1=50%. The corrective curve can be determined by simple calculations because it is an inverse function of the characteristic curve 51.

Figure 11:
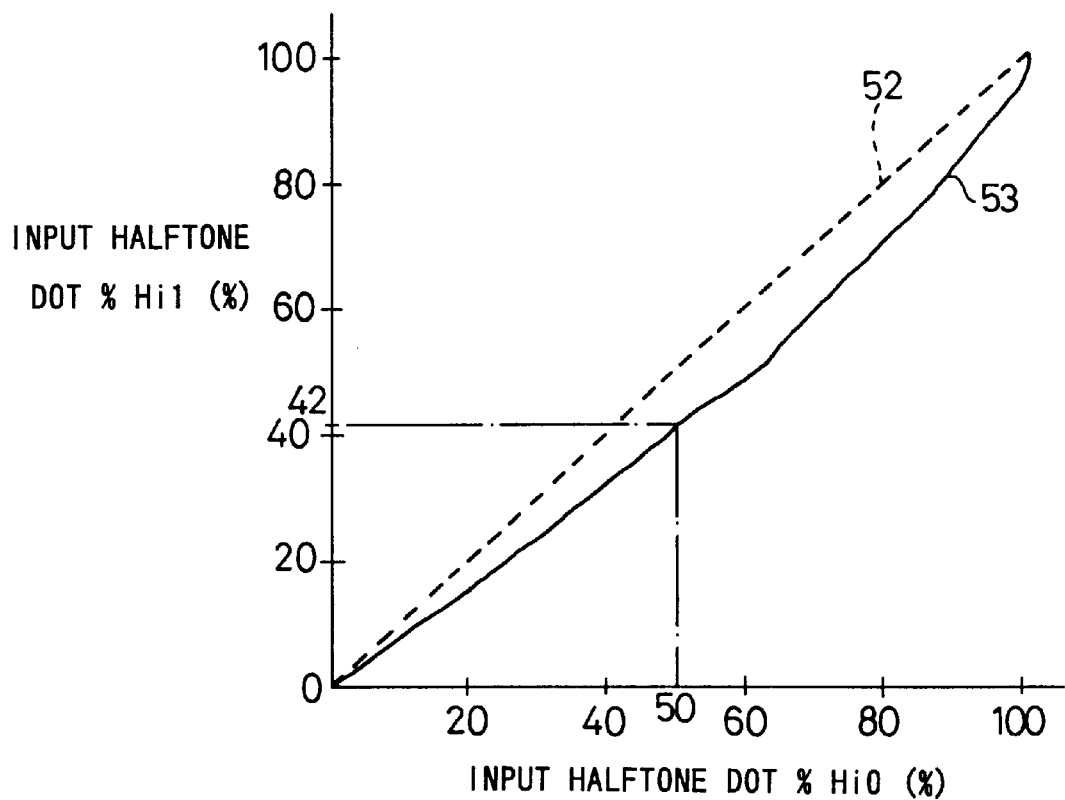
FIG. 11 is a diagram showing a corrective curve for the input/output gradation curve illustrated in FIG. 10.

FIG. 11 shows a corrective curve 53, which is determined as an inverse function of the characteristic curve 51 and referred to as a characteristic curve or gradation-corrected curve, for determining input halftone-dot percentage data Hi1 that makes the output halftone-dot percentage data Ho1 equal to Ho1=50% when input halftone-dot percentage data Hi0 for the corrective curve 53 is Hi0=50%.

It can be seen from FIG. 11 that when the input halftone-dot percentage data Hi0 is Hi0=50%, the input halftone-dot percentage data Hi1 is Hi1=42%. It can be seen from FIG. 10 that when input halftone-dot percentage data Hi1 is Hi1=42%, the output halftone-dot percentage data Ho1 is Ho1=50%.

Consequently, when the halftone-dot percentage data converted from the basic threshold data T outputted from the basic threshold data storage unit 18 is the input halftone-dot percentage data Hi0, the corrected threshold data TC may be converted into threshold data TC corresponding to the input halftone-dot percentage data Hi1 of the characteristic curve 53 shown in FIG. 11 and then supplied to the binary signal generator 22. In this manner, the corrected threshold data TC corresponding to the basic threshold data T can be calculated.

For determining corrected data TC, the corrected threshold data TC can be obtained much more quickly and easily than if test patches are actually outputted to the film F as with the conventional process. According to the conventional process, about 20 test patches have been used and measuring units for measuring the densities and halftone-dot area percentages of output images on the test patches have suffered an error of about 1%. Therefore, the corrected threshold data TC calculated according to the illustrated embodiment allows the characteristic curve 51 to be corrected highly accurately.

In the above embodiment, the corrective curve 53 comprise corrective data for all gradations of the basic threshold data T. However, corrective threshold data TC for discrete gradations may be determined, and corrective threshold data TC for gradations between those discrete gradations may be interpolated. With this modification, it is possible to obtain corrected threshold data TC more accurately and quickly than with the conventional process.

It is possible to generate corrective curves 53 for different types of the output machine 24, different types of the photosensitive medium M, and different conditions of the developing unit 28 (including liquid fatigues of an automatic developing machine).

Such a modification is shown as an image output apparatus 11A shown in FIG. 12. In the image output apparatus 11A, a plurality of corrective curves 53 are stored in a gradation-corrected table 61, and a suitable corrective curve 53 corresponding to the halftone attribute information inputted from the halftone attribute input unit 20 and the output machine information inputted from an output machine/recording medium selector 62 is selected. The selected corrective curve 53 is sent to a corrected threshold data generator 63, which corrects basic threshold data T with the corrective curve 53, producing corrected threshold data TC that is outputted to the binary data generator 22. As shown in FIG. 12, the binary image data Ha from the binary data generator 22 may be supplied to a CTP output machine 64 capable of directly producing a printing plate 65, rather than to the output machine 24 which outputs a film F. If the binary image data Ha from the binary data generator 22 is supplied to the CTP output machine 64, then the gradation-corrected table 61 contains corrective curves 53 corresponding to output conditions of the CTP output machine 64 and recording medium conditions of the printing plate 65. Similarly, corrective curves 53 stored in the gradation-corrected table 61 may comprise corrective curves corresponding to apparatus up to a film converting apparatus or corrective curves corresponding to printed documents produced by a printing press. Those parts shown in FIG. 12 which are identical to those shown in FIG. 1 are denoted by identical reference numerals and representations, and will not be described in detail.

In the image output apparatus 11, 11A, the basic threshold data T is corrected such that the input halftone-dot percentage data and the output halftone-dot percentage data are linearly related to each other. However, the basic threshold data T may not be corrected, but the gradation image data G may be corrected and supplied to a binary signal generator 72 (see FIG. 13).

Such a modification is illustrated as an image output apparatus 11B in FIG. 13. In FIG. 13, the image output apparatus 11B has a binary data processor 70 comprising a lookup table (LUT) 71 as a gradation conversion table and a binary signal generator 72. The calculating unit 12 calculates gradation-corrected values (gradation-corrected curves, gradation-corrected data) based on the information from the halftone attribute input unit 20, the information from the output machine/recording medium information storage unit 14, and the basic threshold data T from the basic threshold data storage unit 18, in the same manner as the flowchart shown in FIG. 2, and stores the calculated gradation-corrected values as a gradation-corrected table in the LUT 71.

The gradation-corrected table stored in the LUT 71 is generated as follows: The input gradation image data G which may take values 0, 1, ..., 155 and the basic threshold data T are compared with each other thereby to generate binary image data Ha, and an amount-of-exposure distribution of digital recorded dot shape PHa (see FIG. 3) is calculated in the step S1. Then, the amount-of-exposure distribution is converted into a density distribution using the characteristic curve 50 in the step S2. Then, the density distribution is converted into halftone-dot percentage data Ho1 (see FIG. 10) according to the equation (1). Thereafter, an input vs. output gradation characteristic curve 51 (see FIG. 10), i.e., a characteristic curve of output halftone-dot percentage data Ho1 with respect to input halftone-dot percentage data Hi1 converted from input gradation image data G, is calculated. A corrective curve 53 (see FIG. 11), which is an inverse function of the input vs. output gradation characteristic curve 51, is calculated. The corrective curve 53 is stored as the gradation-corrected table.

The input image data G supplied through the input terminal 23 is supplied to the LUT 71, and converted into image data (corrected image data) GC having corrected halftone-dot percentage values. The image data GC is then supplied to the binary signal generator 72, which generates binary image data Ha by comparison with the basic threshold data T. The binary image data Ha is supplied to the output machine 24, which produces a film F with an image formed thereon that has smooth gradations.

Inserting a corrector for correcting the image data G before the binary signal generator 72 is known from the Japanese laid-open patent publication No. 7-336536. However, the present invention widely differs from the known system in that the gradation-corrected table is simulated by the calculating unit 12.

In the case where the binary signal processor 70 is employed as shown in FIG. 13, a gradation-corrected table 61 storing a plurality of corrective curves may be used to meet a plurality of halftone attributes and a plurality of types of the output machine 24 as shown in FIG. 12. Such a modification is shown as an image output apparatus 11C in FIG. 14. Those parts shown in FIG. 14 which are identical to those shown in FIGS. 1, 12, 13 are denoted by identical reference numerals and representations, and will not be described in detail.

The output machines 24 in the image output apparatus 11A, 11B, 11C shown in FIGS. 12, 13, 14 comprise output machines for outputting halftone-dot images. However, the principles of the present invention are also applicable to an image output apparatus 11D (see FIG. 15) having an output machine 81 such as a color digital printer for outputting a hard copy HP which carries a density-gradation image.

In the image output apparatus 11D, gradation image data G supplied from the input terminal 23 is converted into gradation-corrected image data GC by an LUT 80.

The calculating unit 12 calculates an amount-of-exposure distribution to be imparted to a hard copy HP as a recording medium based on the halftone attribute information from the halftone attribute input unit 20 and the output machine information from the output machine/recording medium selector 14, and calculates a density distribution of an image to be recorded on the hard copy HP from the calculated amount-of-exposure distribution and density characteristics of the hard copy HP with respect to the amount of exposure. Based on the calculated density distribution, the calculating unit 12 calculated output gradations to be reproduced on the hard copy HP, generates an output gradation characteristic curve with respect to input image data G (corrected image data GC), and generates a corrective characteristic curve based on the output gradation characteristic curve. The generated corrective characteristic curve is stored in the LUT 80.

According to the present invention, the gradations of input image data G are directly corrected on the basis of a gradation-corrected curve simulated in view of halftone attributes and/or output machine conditions, or threshold data T is corrected for correcting the gradations of input image data G.

Therefore, gradation-corrected image data capable of preventing gradation jumps from occurring between the gradations of the input image data G and the gradations of a halftone-dot image outputted on a film F, or gradation-corrected threshold data capable of gradation jumps from occurring between the gradations of the input image data G and the gradations of a continuous gradation image outputted as a hard copy HP by a digital color printer or the like, can be determined in a short period of time. Since the gradation-corrected data and/or gradation-corrected threshold data are simulated, they are produced more accurately than if produced using a halftone-dot area meter or the like.

According to the present invention, as described above, test patches do not need to be actually outputted, neither densitometer nor halftone-dot area meter is required to be used, and gradations can be corrected easily and quickly with high accuracy.

The present invention is applicable to an output machine where the diameter of a beam applied to a recording medium is large and the recording medium has a small characteristic gradient, for producing a smooth corrective curve easily and quickly.

Furthermore, it is possible to calculate an amount of exposure easily at each point of exposure on a recording medium.

Although certain preferred embodiments of the present invention has been shown and described in detail, it should be understood that various changes and modifications may be made therein without departing from the scope of the appended claims.

What is claimed is:

1. A method of generating gradation-corrected image data for use in recording a density gradation image on a recording medium based on input gradation image data by converting the input gradation image data into gradation-corrected image data depending on conditions of an output machine and thereafter scanning the recording medium in the output machine with a light beam based on the gradation-corrected image data, comprising the steps of:

calculating an amount-of-exposure distribution to be imparted to said recording medium based on conditions of said output machine including a shape of recording dots corresponding to input gradations to be recorded on the recording medium and specification details of said light beam;

calculating a density distribution of an image to be recorded on said recording medium from the calculated amount-of-exposure distribution and characteristics of density with respect to an amount of exposure of said recording medium;

calculating output gradations to be actually recorded on said recording medium based on the calculated density distribution;

generating a characteristic curve of the calculated output gradations with respect to said input gradations;

generating a gradation corrective curve based on said characteristic curve; and converting said input gradation image data into the gradation-corrected image data according to said gradation corrective curve.

2. A method of generating gradation-corrected halftone dot percentage data for use in recording a halftone-dot image on a recording medium based on input gradation image data by converting the input gradation image data into gradation-corrected halftone dot percentage data depending on conditions of an output machine, comparing the gradation-corrected halftone dot percentage data with threshold data to produce binary data, and thereafter scanning the recording medium in the output machine with a light beam modulated by the binary data, comprising the steps of:

calculating an amount-of-exposure distribution to be imparted to said recording medium based on conditions of said output machine including a shape of halftone recording dots corresponding to input gradations to be recorded on the recording medium and specification details of said light beam;

calculating a density distribution of an image to be recorded on said recording medium from the calculated amount-of-exposure distribution and characteristics of density with respect to an amount of exposure of said recording medium;

calculating output halftone-dot percentage data to be actually recorded on said recording medium based on the calculated density distribution;

generating a characteristic curve of the calculated output halftone-dot percentage data with respect to said input gradations;

generating a gradation corrective curve based on said characteristic curve; and converting said input gradation image data into the gradation-corrected halftone-dot percentage data according to said gradation corrective curve.

3. A method of generating gradation-corrected threshold data for use in recording a halftone-dot image on a recording medium based on input gradation image data by comparing the input gradation image data with gradation-corrected threshold data depending on conditions of an output machine to produce binary data, and thereafter scanning the recording medium in the output machine with a light beam modulated by the binary data, comprising the steps of:

comparing input gradation data required to reproduce a full range of optical densities for the image on the recording medium with uncorrected threshold data to produce threshold correcting binary data;

calculating an amount-of-exposure distribution to be imparted to said recording medium based on conditions of said output machine including a shape of halftone recording dots to be recorded on the recording medium, produced based on the threshold correcting binary data, and specification details of said light beam;

calculating a density distribution of an image to be recorded on said recording medium from the calculated amount-of-exposure distribution and characteristics of density with respect to an amount of exposure of said recording medium;

calculating output halftone-dot percentage data to be actually recorded on said recording medium based on the calculated density distribution;

generating a characteristic curve of the calculated output halftone-dot percentage data with respect to said uncorrected threshold data;

generating a gradation corrective curve based on said characteristic curve; and generating the gradation-corrected threshold data by correcting a threshold of the uncorrected threshold data according to said gradation corrective curve.

4. An image output apparatus comprising:

a halftone attribute specifying unit for specifying attributes of a halftone-dot image to be outputted;

a calculating unit for calculating gradation correcting data based on the specified attributes, threshold data corresponding thereto, output machine information, and recording medium information;

a gradating corrector for correcting supplied gradation image data with said gradation correcting data to output corrected gradation image data;

a binary signal processor for comparing the corrected gradation image data with said threshold data to generate binary data; and an output machine for scanning said recording medium with a light beam based on said binary data to record a halftone-dot image on the recording medium;

said calculating unit comprising means for calculating an amount-of-exposure distribution to be imparted to said recording medium based on a shape of halftone recording dots as said attributes to be recorded on the recording medium, specification details of said light beam as said output machine information, and said threshold data, calculating a density distribution of an image to be recorded on said recording medium from the calculated amount-of-exposure distribution and characteristics of density with respect to an amount of exposure of said recording medium, calculating halftone-dot percentage data to be actually recorded on said recording medium based on the calculated density distribution, generating a characteristic curve of the calculated output halftone-dot percentage data with respect to said threshold data, generating a gradation corrective curve based on said characteristic curve, and generating the gradation correcting threshold data for correcting the gradations of the gradation image data according to said gradation corrective curve.

5. An image output apparatus according to claim 4, wherein at least one of said output machine information and said recording medium information contains a plurality of items, further comprising an output condition specifying unit for specifying an item of said output machine information and said recording medium information, said calculating unit comprising means for calculating gradation correcting data corresponding to said specified item of the output machine information and the recording medium information.

6. An image output apparatus according to claim 4, wherein said attributes specified by said halftone attribute specifying unit include a halftone-dot shape, a screen ruling, a screen angle, and an output resolution.

7. An image output apparatus comprising:

a halftone attribute specifying unit for specifying attributes of a halftone-dot image to be outputted;

a storage unit for storing gradation correcting data calculated based on the specified attributes, threshold data corresponding thereto, output machine information, and recording medium information;

a gradation corrector for correcting supplied gradation image data with said gradation correcting data read from said storage unit to output corrected gradation image data;

a binary signal generator for comparing said corrected gradation image data with threshold data to generate binary data; and an output machine for scanning a recording medium with a light beam based on said binary data to record a halftone-dot image on the recording medium;

wherein said gradation correcting data stored in said storage unit is produced by calculating an amount-of-exposure distribution to be imparted to said recording medium based on a shape of halftone recording dots as said attributes to be recorded on the recording medium, specification details of said light beam as said output machine information, and said threshold data, calculating a density distribution of an image to be recorded on said recording medium from the calculated amount-of-exposure distribution and characteristics of density with respect to an amount of exposure of said recording medium, calculating halftone-dot percentage data to be actually recorded on said recording medium based on the calculated density distribution, generating a characteristic curve of the calculated output halftone-dot percentage data with respect to said threshold data, generating a gradation corrective curve based on said characteristic curve, and using said gradation corrective curve said gradation correcting data.

8. An image output apparatus according to claim 7, wherein at least one of said output machine information and said recording medium information contains a plurality of items, further comprising an output condition specifying unit for specifying an item of said output machine information and said recording medium information, said gradation correcting data used in said gradation corrector being specified by said output condition specifying unit.

9. An image output apparatus according to claim 7, wherein said attributes specified by said halftone attribute specifying unit include a halftone-dot shape, a screen ruling, and a screen angle.

10. An image output apparatus comprising:

a halftone attribute specifying unit for specifying attributes of a halftone-dot image to be outputted;

a calculating unit for calculating gradation-corrected threshold data based on the specified attributes, uncorrected threshold data corresponding thereto, output machine information, and recording medium information;

a binary signal generator for comparing supplied image data with said gradation-corrected threshold data to generate binary data; and an output machine for scanning a recording medium with a light beam based on said binary data to record a halftone-dot image on the recording medium;

said calculating unit comprising means for calculating an amount-of-exposure distribution to be imparted to said recording medium based on a shape of halftone recording dots as said attributes to be recorded on the recording medium, and specification details of said light beam as said output machine information, calculating a density distribution of an image to be recorded on said recording medium from the calculated amount-of-exposure distribution and characteristics of density with respect to an amount of exposure of said recording medium, calculating halftone-dot percentage data to be actually recorded on said recording medium based on the calculated density distribution, generating a characteristic curve of the calculated output halftone-dot percentage data with respect to said uncorrected threshold data, generating a gradation corrective curve based on said characteristic curve, and generating the gradation-corrected threshold data from the uncorrected threshold data according to said gradation corrective curve.

11. An image output apparatus according to claim 10, wherein at least one of said output machine information and said recording medium information contains a plurality of items, further comprising an output condition specifying unit for specifying an item of said output machine information and said recording medium information, said calculating unit comprising means for calculating gradation-corrected threshold data corresponding to said specified item of the output machine information and the recording medium information.

12. An image output apparatus according to claim 10, wherein said attributes specified by said halftone attribute specifying unit include a halftone-dot shape, a screen ruling, and a screen angle.

13. An image output apparatus comprising:
a halftone attribute specifying unit for specifying attributes of a halftone-dot image to be outputted;
a storage unit for storing gradation-corrected threshold data calculated based on the specified attributes, uncorrected threshold data corresponding thereto, output machine information, and recording medium information;
a binary signal generator for comparing supplied threshold image data with said gradation-corrected threshold data read from said storage unit to generate binary data; and
an output machine for scanning a recording medium with a light beam based on said binary data to record a halftone-dot image on the recording medium;
wherein said gradation-corrected threshold data stored in said storage unit is produced by calculating an amount-of-exposure distribution to be imparted to said recording medium based on a shape of halftone recording dots as said attributes to be recorded on the recording medium, and specification details of said light beam as said output machine information, calculating a density distribution of an image to be recorded on said recording medium from the calculated amount-of-exposure distribution and characteristics of density with respect to an amount of exposure of said recording medium, calculating halftone-dot percentage data to be actually recorded on said recording medium based on the calculated density distribution, generating a characteristic curve of the calculated output halftone-dot percentage data with respect to said threshold data, generating a gradation corrective curve based on said characteristic curve, and generating said gradation-corrected threshold data by correcting a threshold of the uncorrected threshold data according to said gradation corrective curve.

14. An image output apparatus according to claim 13, wherein at least one of said output machine information and said recording medium information contains a plurality of items, further comprising an output condition specifying unit for specifying an item of said output machine information and said recording medium information, and wherein the gradation-corrected threshold data used by said binary signal generator is specified by said output condition specifying unit.

15. An image output apparatus according to claim 13, wherein said attributes specified by said halftone attribute specifying unit include a halftone-dot shape, a screen ruling, and a screen angle.

16. An image output apparatus comprising:
a halftone attribute specifying unit for specifying attributes of a halftone-dot image to be outputted;
a threshold data storage unit for outputting threshold data corresponding to the specified attributes;
an output condition specifying unit for specifying an item from output machine information and recording medium information, at least one of which contains a plurality of items;
a corrective characteristic storage unit for storing a plurality of corrective characteristics of gradation-corrected threshold data with respect to said threshold data based on the attributes specified by said halftone attribute specifying unit, threshold data corresponding thereto, and the item of the output machine information and recording medium information which is specified by said output condition specifying unit;
a corrected threshold data generator for outputting gradation-corrected threshold data produced by correcting the threshold data supplied from said threshold data storage unit with the corrective characteristics stored in said corrective characteristic storage unit;
a binary signal generator for comparing inputted gradation image data with said gradation-corrected threshold data to produce binary data; and
an output machine for generating a halftone-dot image based on said binary data and outputting the halftone-dot image to a recording medium;
wherein said corrective characteristics stored in said corrective characteristic storage unit are produced by calculating an amount-of-exposure distribution to be imparted to said recording medium based on a shape of halftone recording dots as said attributes to be recorded on the recording medium, and specification details of said light beam as said output machine information, calculating a density distribution of an image to be recorded on said recording medium from the calculated amount-of-exposure distribution and characteristics of density with respect to an amount of exposure of said recording medium, calculating halftone-dot percentage data to be actually recorded on said recording medium based on the calculated density distribution, generating a characteristic curve of the calculated output halftone-dot percentage data with respect to said threshold data, and generating the corrective characteristics based on said characteristic curve.

17. An image output apparatus according to claim 16, wherein said attributes specified by said halftone attribute specifying unit include a halftone-dot shape, a screen ruling, and a screen angle.

18. A method of calculating an amount of exposure to be applied to a recording medium by a laser beam modulated by binary image data, comprising the steps of:
turning on a laser beam at a point of transition of binary image data from a low level to a high level, keeping the laser beam on during a high-level interval of the binary image data, and turning off the laser beam at a point of transition of the binary image data from the high level to the low level; and
integrating an amount of exposure determined from a configuration of the laser beam in a period from generation to elimination of the laser beam, at each of exposure points on a recording medium which correspond respectively to points of the binary image data, and calculating the integrated amount of exposure as an amount of exposure at each of the exposure points on the recording medium.

* * * * *